US 9,292,219 B2

(12) United States Patent
Oiwa

(10) Patent No.: US 9,292,219 B2
(45) Date of Patent: Mar. 22, 2016

(54) COMPUTER SYSTEM, VIRTUALIZATION MECHANISM, AND CONTROL METHOD FOR COMPUTER SYSTEM

(71) Applicant: Hitachi, Ltd., Tokyo (JP)

(72) Inventor: Eiichiro Oiwa, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 327 days.

(21) Appl. No.: 13/908,633

(22) Filed: Jun. 3, 2013

(65) Prior Publication Data

US 2013/0326177 A1 Dec. 5, 2013

(30) Foreign Application Priority Data

Jun. 4, 2012 (JP) .................................. 2012-127420

(51) Int. Cl.
*G06F 3/06* (2006.01)
*G06F 9/455* (2006.01)

(52) U.S. Cl.
CPC .............. *G06F 3/0647* (2013.01); *G06F 3/061* (2013.01); *G06F 3/0683* (2013.01); *G06F 9/45558* (2013.01); *G06F 2009/4557* (2013.01)

(58) Field of Classification Search
CPC ..... G06F 3/061; G06F 3/0611; G06F 3/0613; G06F 3/0647; G06F 3/067; G06F 3/0683; G06F 9/45533; G06F 9/45558; G06F 2009/4557; G06F 2009/45579
See application file for complete search history.

(56) References Cited

U.S. PATENT DOCUMENTS

| 7,484,208 | B1 * | 1/2009 | Nelson ................ G06F 9/45558 711/6 |
| 8,010,719 | B2 | 8/2011 | Moriki et al. |
| 2008/0059726 | A1 * | 3/2008 | Rozas ..................... G06F 21/53 711/156 |
| 2008/0172499 | A1 * | 7/2008 | Moriki et al. .................. 710/22 |
| 2009/0089781 | A1 * | 4/2009 | Shingai et al. .................... 718/1 |
| 2010/0031258 | A1 | 2/2010 | Takano et al. |
| 2011/0066597 | A1 * | 3/2011 | Mashtizadeh et al. ........ 707/640 |
| 2011/0154333 | A1 * | 6/2011 | Miyamoto et al. ................ 718/1 |
| 2011/0197039 | A1 * | 8/2011 | Green et al. .................. 711/162 |
| 2011/0225285 | A1 | 9/2011 | Patel et al. |
| 2012/0137098 | A1 * | 5/2012 | Wang et al. ................... 711/165 |
| 2012/0284234 | A1 * | 11/2012 | Mashtizadeh et al. ........ 707/655 |

FOREIGN PATENT DOCUMENTS

| JP | 2008-176482 A | 7/2008 |
| JP | 2010-033404 A | 2/2010 |

OTHER PUBLICATIONS

How does Xen work?; Apr. 2006; pp. 163-170, 192.

* cited by examiner

*Primary Examiner* — Michael Krofcheck
(74) *Attorney, Agent, or Firm* — Foley & Lardner LLP

(57) ABSTRACT

Computer system is provided with a first physical computer and a second physical computer. The first physical computer is provided with a control device and a storage device coupled to the control device. The control device of the first physical computer constructs a virtual computer and can execute a predetermined guest program on the virtual computer. A part of a region of the storage device is used as a virtual storage device that is a storage device for the virtual computer. In the case in which the control device executes a live migration which is to migrate the virtual computer of the first physical computer to the second physical computer while executing the guest program in a substantial way, the control device executes a control for reducing a data writing amount in a certain period of time to a virtual storage device that has been allocated to the virtual computer.

12 Claims, 14 Drawing Sheets

COMPUTER SYSTEM, VIRTUALIZATION MECHANISM, AND CONTROL METHOD FOR COMPUTER SYSTEM

CROSS REFERENCE TO PRIOR APPLICATION

This application relates to and claims the benefit of priority from Japanese Patent Application number 2012-127420, filed on Jun. 4, 2012 the entire disclosure of which is incorporated herein by reference.

BACKGROUND

A virtual computer has been operated for a physical computer. In addition, a technique that is described in Literature 1 is known as a technique for moving a virtual computer that is operated for a physical computer to other physical computer. Literature 1 discloses a technique in which a management part stops a virtual computer of a transfer source, defines a virtual computer of a transfer destination on other physical computer, inhibits the initiation, modifies the configuration information of the virtual computer of a transfer source and the configuration information of the virtual computer of a transfer destination, and then cancels the inhibition of the initiation for the virtual computer of a transfer destination in the case in which a virtual computer that is operated on a real computer is migrated to other real computer.
[Literature 1] Japanese Patent Application Laid-Open Publication No. 2010-33404

SUMMARY

In many cases for a lot of services such as an authentication service and a reservation system, a non-disruptive supply of a service is required for 24 hours all the year over. In order to implement such non-disruptive supply of a service, a physical computer that can be operated for 24 hours all the year over is necessary. However, a physical computer has to be stopped due to an occurrence of a failure in a practical sense in some cases. As a failure that occurs in a physical computer, there are a failure of firmware, a failure caused by a physical deterioration of each part of the physical computer, and a system halt caused by a load that exceeds an ability of the physical computer.

A failure of firmware does not occur in the case in which the firmware is exchanged or another apparatus to which corrected firmware has been applied is used before a code of a failure part runs. For a deterioration of a physical computer, since a correctable error (CE) is reported to the firmware in advance in some cases, it is not necessary to stop a service in the case in which a service is migrated to other physical computer when a correctable error occurs. In addition, a service can be continued without a system halt in the case in which a service is migrated to a physical computer with a high ability before a load that is equal to or larger than an ability of the physical computer is going to be applied.

As described above, in the case in which a service can be migrated between physical computers without a service halt without being restricted by a physical computer, a service can be supplied without a service halt for 24 hours all the year over.

In the case in which an OS (operating system) or an application that supplies a service is installed to a physical computer, the OS that supplies a service cannot be migrated to other physical computer without a service halt.

On the other hand, in the case in which a virtual computer is created by software under an OS as a technique that is described in Literature 1, the virtual computer can be migrated between physical computers.

However, for the technique that is described in Literature 1, it is necessary that an operation of a virtual computer is stopped until a migration of a virtual computer is completed.

On the other hand, there is a technique of a live migration in which it looks like that a virtual computer is migrated to other physical computer without a halt in a practical way by appropriately stopping a virtual computer for a short time that is not recognized by an OS (several ms to one second) and by moving a virtual computer to other physical computer when a virtual computer continues an execution of the processing.

As a part that configures a virtual computer, an HBA (Host Bus Adapter) device that is configured to send data to a network in which a high speed data transfer is possible such as a SAN (Storage Area Network) is necessary. In the case in which the HBA device is virtualized or emulated by software entirely, a processing of a physical processor that is used for the emulation is required. In the case in which the HBA is emulated by a physical processor, a degradation of a data performance such as a degradation of a data transfer bandwidth and an increase in the data transfer latency occurs as compared with the case in which a physical HBA is used without the emulation.

As a technique for suppressing a degradation of a data performance caused by the emulation to be equal to or less than 10% for instance as compared with the case in which the emulation is not carried out, there is a technique in which an NPIV (N_Port ID virtualization) that is a function of the HBA is used and not a physical HBA but a virtual port that has been created by the NPIV appears for a virtual computer. In the case in which the NPIV appears for a virtual computer, a processing that is required to be executed for the physical processor such as a DMA (direct memory access) transfer and a creation of a packet that is sent to a network can be executed by the physical HBA. As described above, since a part of processing can be executed by the physical HBA, a degradation of a data transfer bandwidth and an increase in the data transfer latency can be suppressed to be lower.

Moreover, since one port can be used as a plurality of ports by the NPIV, a data transfer is possible by using another port even in the case in which one port is being used. Before a data transfer is executed between the HBA and a data storage device, a login (authorization) is necessary from an HBA port to a SAN fabric. It takes several minutes to execute the login (a login time) in some cases depending on a configuration of a SAN. Similarly, for a virtual computer to which an NPIV port has been allocated, a login is necessary before a data transfer is executed between the HBA and a data storage device.

For instance for the live migration, it is necessary that a logout of the NPIV is executed by a physical computer of a transfer source and then a login of the NPIV is executed by a physical computer of a transfer destination. Since it takes several minutes for executing a login in some cases as described above, for a virtual computer of a physical computer of a transfer destination, there is a possibility that a data transfer with a storage device is stopped for several minutes.

As a method for solving a halt of a data transfer related to a login, there is a method for utilizing the NPIV technique in which one physical port can be shared and used as a plurality of ports, executing a login of another NPIV port when an NPIV port of a migration target executes a login, sending data to a port different from the NPIV port of a migration target, executing a logout of the NPIV port of a migration target, and executing a logout of an NPIV port that is corresponded to the NPIV port of a migration target for a physical computer of a transfer destination. In accordance with this method, in the case in which a virtual computer for a physical computer of a transfer destination is operated, a data transfer with a storage device is not stopped for several minutes.

It assumed that a live migration is executed in the case in which a virtual computer executes a data transfer with a storage device in a processing under the environment that displaying a performance close to the maximum data transfer bandwidth of a physical computer. As a data transfer route for executing a live migration, a transfer route that is provided with a performance lower than that of a data transfer bandwidth with a data storage device is used in some cases. For a live migration, it is necessary that the contents of a memory (guest memory) of a virtual computer of a transfer source are reflected to a memory of a virtual computer of a transfer destination. In the case in which a bandwidth of write data to a memory is larger than a bandwidth of a data transfer route for a migration, a processing for reflecting the contents of a memory of a virtual computer of a transfer source to a memory of a virtual computer of a transfer destination cannot be caught up with, and there is a possibility that a live migration is not completed to the end of time.

The present invention was made in consideration of such conditions, and an object of the present invention is to provide a technique for moving a virtual computer to other physical computer in an appropriate manner.

A computer system is provided with a first physical computer and a second physical computer that is coupled to the first physical computer. The first physical computer is provided with a control device and a storage device that is coupled to the control device. The control device of the first physical computer constructs a virtual computer and can execute a predetermined guest program on the virtual computer. A part of a region of the storage device is used as a virtual storage device that is a storage device for the virtual computer. In the case in which the control device executes a live migration which is to migrate the virtual computer of the first physical computer to the second physical computer while executing the guest program in a substantial way, the control device executes a control for reducing a data writing amount in a certain period of time to a virtual storage device that has been allocated to the virtual computer.

A virtual computer that is operated for one physical computer can be migrated to other physical computer by a live migration in an appropriate manner.

DETAILED DESCRIPTION OF THE EMBODIMENT

Figure 1:
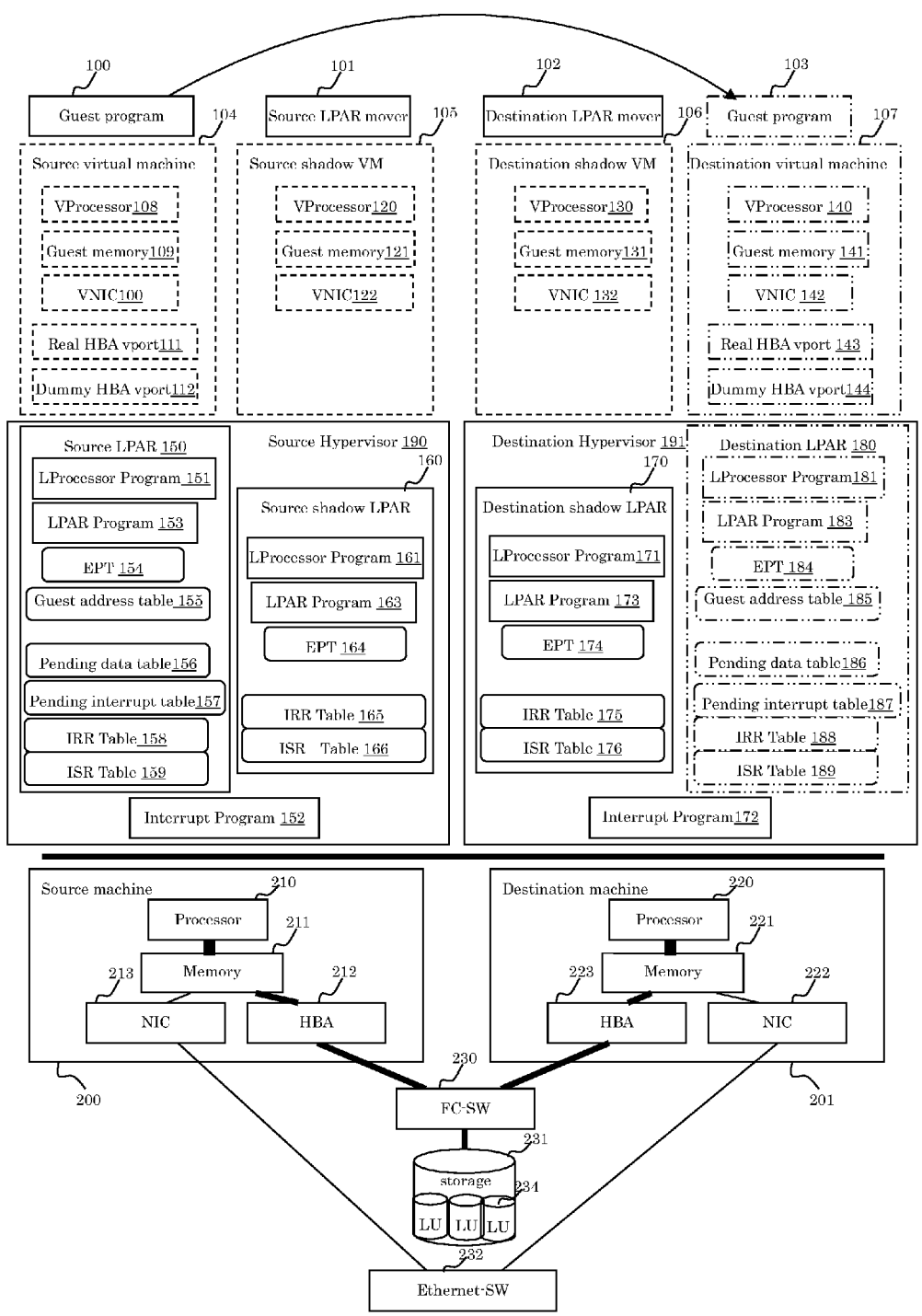
FIG. 1 is a configuration diagram showing a computer system in accordance with an embodiment of the present invention.

An embodiment will be described with reference to drawings in the following. The embodiment that will be described in the following does not restrict the invention in accordance with the claims, and all of elements and all of combinations of the elements that will be described in the embodiments are not necessarily essential for the means for solving the problems of the invention.

In the following descriptions, while a wide variety of information will be described in the expression of "aaa table" in some cases, a wide variety of information can be represented by any data structure other than a table. In order to indicate that a wide variety of information is not depended on a data structure, the expression of "aaa table" can also be referred to as "aaa information".

In the following descriptions, the processing will be described while a "program" is handled as a subject in some cases. In the case in which the program is executed by a processor (for instance, a CPU (Central Processing Unit)), the processor executes the predetermined processing by using a storage resource (such as a memory) and/or a communication control device (such as a NIC and an HBA) as it decides proper. Consequently, a subject of a processing can also be a processor. The processing that is described while a program is handled as a subject can also be a processing that is executed by a processor or a device that is provided with the processor (such as a computer). Moreover, a part or a whole of a program can be implemented by the dedicated hardware. A computer program can be installed from a program source to each of the devices. The program source can be a program distribution server or a storage medium for instance.

The summary of the present embodiment will be described in the following.

In the case in which data of a device (such as a memory 211 in FIG. 1) that is provided with a data transfer bandwidth higher than that of a transfer route of data for a live migration is migrated by a live migration, it is necessary that the data transfer bandwidth of the device (a data transfer amount in a certain period of time) is controlled.

In the case in which a data transfer of a physical computer that configures a virtual computer 104 of a transfer source is not implemented by an emulation of a physical processor 210 and a data transfer function is implemented by using a function of hardware (such as an HBA 212), a DMA transfer is executed by a physical device without an emulation and an intervention of the physical processor 210, and writing and reading are executed directly to a memory 211 (a guest memory 109) that has been allocated to the virtual computer 104. In this case, it is necessary that the bandwidth of a DMA transfer is controlled by a physical device.

In addition, for data writing to a guest memory 109 that has been allocated to the virtual computer 104 to which an intervention of the physical processor 210 is enabled, since there is a data transfer bandwidth higher than that of a transfer route of data for a live migration, it is necessary that the transfer bandwidth is controlled for the data writing.

As a method for controlling a transfer bandwidth itself in which a physical device executes a transfer among methods for controlling a bandwidth of a DMA transfer, an internal mechanism of a physical device must be modified for controlling a bandwidth of a DMA transfer. Since it is difficult to modify an internal mechanism of a physical device, it is also difficult to control a transfer bandwidth itself in which a physical device executes a transfer.

Consequently, in the case in which a DMA transfer is executed by the maximum performance on a consistent basis, there is no method for controlling a bandwidth of a DMA transfer. However, a substantive bandwidth of a DMA transfer can be controlled by controlling a time when a DMA transfer is executed and a time when a DMA transfer is not executed. Here, a substantive bandwidth of a DMA transfer is a value that is obtained by dividing an amount of a DMA data transfer that is executed in a total time by the total time of a sum of a time when a DMA transfer is not executed (that is, a time when a bandwidth is 0) and a time when a DMA transfer is executed.

In the present embodiment, a bandwidth of a DMA transfer is controlled by controlling a time when a DMA transfer is not executed. For instance, a time when a DMA transfer is not executed is controlled by delaying an interrupt report of a device to which an intervention of the physical processor 210 is enabled. By delaying an interrupt report, a writing frequency to a guest memory 109 that has been allocated to a virtual computer 104 by a DMA transfer such as a disk read is controlled. Since a writing frequency to a guest memory 109 that has been allocated to a virtual computer 104 can be controlled as described above, a data transfer can be executed in an appropriate manner by using a transfer route of data for a live migration.

Moreover, for writing to a guest memory 109 that has been allocated to a virtual computer 104 to which an intervention of the physical processor 210 is enabled, a bandwidth control is executed by using a write protecting function of the physical processor 210. In the case in which data is written to a guest memory 109 as a practical matter after a write protecting exception (a data writing request to a region to which a write protection is applied) occurs, it is necessary that the write protecting exception is canceled. A write bandwidth to a guest memory 109 is controlled by delaying a cancellation of the write protecting exception. For a bandwidth control using a write protecting function, a write bandwidth to a guest memory 109 can be controlled. As a result, the bandwidth control using a write protecting function can be used for a bandwidth restriction of data writing such as data writing to a data storage device in which the write data is written to a guest memory 109 that has been allocated to a virtual computer and writing is requested to a device by a physical processor 210. Since a write bandwidth to a guest memory 109 that has been allocated to a virtual computer 104 can be controlled as described above, a data transfer can be executed in an appropriate manner by using a transfer route of data for a live migration.

A computer system in accordance with an embodiment of the present invention will be described in detail in the following.

FIG. 1 is a configuration diagram showing a computer system in accordance with an embodiment of the present invention.

A computer system is provided with a transfer source physical computer (Source machine: an example of a first physical computer) 200 for operating a virtual computer of a transfer source, a transfer destination physical computer (Destination machine: an example of a second physical computer) 201 that is a transfer destination of a virtual computer, a fiber channel switch (FC-SW) 230, a storage 231, and an Ethernet switch (Ethernet-SW: Ethernet is a registered trademark) 232. The transfer source physical computer 200 and the transfer destination physical computer 201 are coupled to each other via the Ethernet switch 232. In the present embodiment, a communication bandwidth between the transfer source physical computer 200 and the transfer destination physical computer 201 is 1 Gbps for instance. In the present embodiment, a network that is coupled via the Ethernet switch 232 is a transfer route of data for a live migration. The transfer source physical computer 200 and the storage 231 are coupled to each other via the FC-SW 230. The transfer destination physical computer 201 and the storage 231 are coupled to each other via the FC-SW 230. In the present embodiment, a communication bandwidth of the line between the transfer source physical computer 200 or the transfer destination physical computer 201 and the storage 231 is larger than a communication bandwidth between the transfer source physical computer 200 and the transfer destination physical computer 201 via the Ethernet switch 232, and is 8 Gbps for instance. The storage 231 manages at least one LU (Logical Unit) 234 that stores data that is used by the transfer source physical computer 200 or the transfer destination physical computer 201. The storage 231 is provided with an access limitation in such a manner that only an HBA that is provided with a WWN (World Wide Name) that is registered to the FC-SW 230 can write or read data to the LU (Logical Unit) 234.

The transfer source physical computer 200 is provided with a physical processor 210 as an example of a control device, a memory 211 as an example of a storage device, an HBA (Host Bus Adapter) 212 as an example of a transfer device, and a NIC (Network Interface Controller) 213. The physical processor 210 is configured to execute a wide variety of programs (such as a guest program 100) and execute a wide variety of processing (such as an emulation of a device). The memory 211 is configured to store a wide variety of programs and data that is used for processing by the programs. The HBA 212 is configured to execute a write of data to the storage 231 or a read of data from the storage 231. The HBA 212 can execute a DMA transfer. In the case in which data is written to the storage 231, when a write request that includes data to be written is transmitted to the HBA 212, the HBA 212 that has received the write request of data writes data to the storage 231 via the FC-SW 230. Moreover, in the case in which data is read from the storage 231, when a read request is transmitted to the HBA 212, the HBA 212 that has received the read request of data reads data from the storage 231 via the FC-SW 230. The NIC 213 is configured to communicate with other devices (such as the transfer destination physical computer 201) that are coupled to each other via the Ethernet switch 232. In the present embodiment, a program (a guest program) 100 that is executed by the virtual computer 104 of the transfer source physical computer 200 and a wide variety of data that is sent to the transfer destination physical computer 201 during a live migration are transmitted.

The HBA 212 can operate one HBA port as a plurality of virtual ports that are provided with a plurality of WWN by the NPIV (N_Port ID virtualization) technique, and can control read and write to the LU 234 separately for every WWN. In other words, even in the case in which there is one HBA port that is physically coupled to the FC-SW 230, each of a plurality of virtual HBA ports can select the LU 234 of a read/write target separately, and can read or write data to the LU 234 separately.

The transfer destination physical computer 201 is provided with a physical processor 220, a memory 221, an HBA 223, and a NIC 222. Each configuration of the transfer destination physical computer 201 is equivalent to a configuration of the same name for the transfer source physical computer 200.

The transfer source physical computer 200 can be operated as at least one virtual computer 104 and 105 by using a method for classifying users of the physical processor 210, the memory 211, the NIC 213, and the HBA 212 for every predetermined time or by using a method for classifying usage regions of the physical device. For instance, the transfer source physical computer 200 can construct a virtual computer by executing a transfer source hypervisor 190 with the physical processor 210. The transfer source hypervisor 190 stores a transfer source LPAR (logical partition) 150, a transfer source shadow LPAR 160, and an interrupt program 152 and so on. The transfer source virtual computer 104 is constructed by executing the transfer source hypervisor 190 and the transfer source LPAR 150 with the physical processor 210, and the transfer source shadow virtual computer 105 is constructed by executing the transfer source hypervisor 190 and the transfer source shadow LPAR 160 with the physical processor 210.

The transfer destination physical computer 201 can also be operated as at least one virtual computer 106 and 107 by using a method for classifying users of the physical processor 220, the memory 221, the NIC 223, and the HBA 222 for every predetermined time or by using a method for classifying usage regions of the physical device. For instance, the transfer destination physical computer 201 can construct a virtual computer by executing a transfer destination hypervisor 191 with the physical processor 220. The transfer destination hypervisor 191 stores a transfer destination LPAR 170 and an interrupt program 172 and so on. After a live migration, the transfer destination hypervisor 191 further stores the transfer destination LPAR 180. The transfer destination shadow virtual computer 106 is constructed by executing the transfer destination hypervisor 191 and the transfer destination shadow LPAR 170 with the physical processor 210, and the transfer destination virtual computer 107 is constructed by executing the transfer destination hypervisor 191 and the transfer destination LPAR 180 with the physical processor 220. The transfer source hypervisor 190 and the transfer destination hypervisor 191 are so-called virtual mechanism.

The transfer source virtual computer 104 is a computer that is supplied to a user. The guest program 100 is executed on the transfer source virtual computer 104. As the guest program 100, there are an OS and an application that is accompanied by the input/output of data with the storage 231. The transfer source virtual computer 104 is provided with a virtual processor (VProcessor) 108, a guest memory 109, a virtual NIC (VNIC) 110, a real HBA virtual port (Real HBA vport) 111, and a dummy HBA virtual port (Dummy HBA Vport) 112. The virtual processor 108 is a virtual processor that is implemented in the case in which a part of resources of the physical processor 210 is supplied. The guest memory 109 is a memory to which a part of a region of the memory 211 is allocated. The virtual NIC 110 is a virtual NIC that is configured by using a function of the NIC 213. The real HBA virtual port 111 and a dummy HBA virtual port 112 are virtual HBA ports that are configured by using an NPIV function of the HBA212. Any one of the real HBA virtual port 111 and a dummy HBA virtual port 112 can be supplied and utilized to the guest program 100 that is operated on the transfer source virtual computer 104. In the case in which a live migration is executed, the transfer destination virtual computer 107 is provided with a configuration equivalent to that of the transfer source virtual computer 104 for the last time. For the transfer destination virtual computer 107, a guest program 103 equivalent to the guest program 100 is executed.

The transfer source shadow virtual computer 105 is a computer for executing a processing on a side of the transfer source physical computer 200 for a data transfer for a live migration for moving a virtual computer from the transfer source physical computer 200 to the transfer destination physical computer 201. The transfer source LPAR mover 101 that is a program for executing a data transfer for a live migration for moving a virtual computer (more specifically, a transfer of data for duplicating the transfer source LPAR 150 and the guest memory 109 (duplication data)) on the transfer source shadow virtual computer 105 is executed. The transfer source shadow virtual computer 105 is provided with a virtual processor 120, a guest memory 121, and a virtual NIC 122. The virtual processor 102 is a virtual processor that is implemented in the case in which a part of resources of the physical processor 210 is supplied. The guest memory 121 is a memory to which a part of a region of the memory 211 is allocated. The virtual NIC 122 is a virtual NIC that is configured by using a function of the NIC 213.

The transfer destination shadow virtual computer 106 is a computer for executing a processing on a side of the transfer destination physical computer 201 for a data transfer for a live migration for moving a virtual computer from the transfer source physical computer 200 to the transfer destination physical computer 201. The transfer destination LPAR mover 102 that is a program for executing a data transfer for a live migration for moving a virtual computer on the transfer destination shadow virtual computer 106 is executed. The transfer destination shadow virtual computer 106 is provided with a virtual processor 130, a guest memory 131, and a virtual NIC 132. Each configuration of the transfer destination shadow virtual computer 106 is equivalent to a configuration of the same name for the transfer source shadow virtual computer 105.

An interrupt program 152 is a program that receives an interrupt from the physical processor 210, the NIC 213, and the HBA 212 and that notifies the transfer source LPAR 150 or the transfer source shadow LPAR 160 of an occurrence of the interrupt. In the case in which a bandwidth control in accordance with the present embodiment is not executed, the interrupt program 152 records an occurrence of the interrupt to an IRR table (Interrupt Request Register Table) 158 described later for the transfer source LPAR 150 or an IRR table 165 for the transfer source shadow LPAR 160.

On the other hand, in the case in which a bandwidth control in accordance with the present embodiment is executed, the interrupt program 152 suspends an interrupt in the case in which an interrupt pending condition is satisfied during a live migration (the interrupt pending condition will be described later). At this time, in the case in which the interrupt is suspended, the interrupt program 152 registers the information that indicates an interrupt vector that is corresponded to the interrupt to be suspended to a pending interrupt table 157. The interrupt vector is a number that indicates a type of an interrupt. Moreover, the interrupt program 152 records a write data length (an update data length) by the DMA and a time that occurs (such as tsc: time stamp counter of the x86 series processor) that are reported to the guest program 100 by the interrupt that is suspended to a pending data table 156.

The transfer source LPAR 150 is provided with an L processor program 151, an LPAR program153, an EPT (extended page table) 154, a guest address table 155, the pending data table 156, the pending interrupt table 157, an IRR table 158, and an ISR (In-Service Register) table 159.

The L processor program 151 is a program that is executed by an interrupt to the guest program 100 in the case in which the guest program 100 cannot be executed directly by the physical processor due to a write protection or the like.

In the case in which a control is passed from the guest program, the L processor program 151 confirms the contents of the IRR table 158 and registers an interrupt vector that is provided with the highest priority level among interrupt vectors that have been registered to the IRR table 158 to the ISR table 159. At this time, the L processor program 151 lowers a bit of the IRR table 158 that is corresponded to an interrupt vector that has been registered to the IRR table 158 and cancels a record of the interrupt vector. For the x86 series processor, an interrupt vector is indicated with 8 bits and the upper 4 bits indicate a priority level of an interrupt report. The larger a value of the upper 4 bits is, the higher a priority level of an interrupt vector is.

The transfer source LPAR 150 configures the EPT 154 and allocates a region of a certain part of the memory 211 that is managed by the hypervisor 190 in such a manner that the guest program 100 can use the memory 211. The region to which the memory 211 has been allocated is a region of the guest memory 109.

The EPT 154 is an address conversion table that indicates which address of a region of the memory 211 that is managed by the hypervisor 190 (a hypervisor address) the physical address (guest address) of the guest memory 109 of the transfer source virtual computer 104 is corresponded to. Here, the guest address is a physical address that is used by the guest program 100. The EPT 154 is called a nested page table in some cases.

The EPT 154 stores an attribute that is related to a memory access such as a write protection, a read protection, and an instruction execution protection for data of the region, and a cache attribute for every region in a 4 KB page unit or a 2 MB page unit for the guest memory 109. Here, the page is a minimum unit in which a processor can modify a memory access attribute.

An LPAR program 153 configures the EPT 154 when the guest memory 109 is allocated to the guest program 100 in an activation of the transfer source virtual computer 104. Moreover, the LPAR program 153 rewrites the EPT 154 in such a manner that all regions of the guest memory 109 are provided with a write protection attribute when a live migration is executed.

A guest address table 155 stores a physical address (a guest memory address) that is used by the guest program 100 in which a write protection exception, that is, data writing to a region to which a write protection has been applied occurs and a time (tsc) when a protection exception occurs.

The pending data table 156 stores a write data length (an update data length) by an DMA that is reported to the guest program 100 and an occurrence time.

The pending interrupt table 157 registers an interrupt vector that indicates an interrupt that is suspended. In the present embodiment, the pending interrupt table 157 is a bit table that is configured by a plurality of bits (such as 256 bits), and each bit is corresponded to each interrupt vector that has the potential to occur. For instance, in the case in which an interrupt vector that indicates an interrupt that is suspended is 50 (0×32), a bit of the 50th bit of the pending interrupt table 157 is set to be 1.

The IRR table 158 is a table for registering an interrupt vector that indicates an interrupt that has occurred. The IRR table 158 is a bit table that is configured by a plurality of bits (such as 256 bits), and each bit is corresponded to each interrupt vector that has the potential to occur. For instance, in the case in which an interrupt vector that indicates an interrupt that is suspended is 50 (0×32), a bit of the 50th bit of the IRR table 158 is set to be 1.

The ISR table 159 is a table for registering an interrupt vector that indicates an interrupt that has been reported to the guest program 100. The ISR table 159 is a bit table that is configured by a plurality of bits (such as 256 bits), and each bit is corresponded to each interrupt vector that has the potential to occur. For instance, in the case in which an interrupt vector that indicates an interrupt that has been reported to the guest program 100 is 50 (0×32), a bit of the 50th bit of the ISR table 159 is set to be 1.

The transfer destination LPAR 180 is provided with a configuration equivalent to that of the transfer source LPAR 150 when a live migration is completed. The transfer destination LPAR 180 is managed in such a manner that the transfer destination LPAR 180 is not operated until the transfer source LPAR 150 is stopped. Similarly, the transfer destination virtual computer 107 that is constructed by the transfer destination LPAR 180 and a guest program 103 that is operated on the transfer destination virtual computer 107 are also managed in such a manner that the transfer destination virtual computer 107 and the guest program 103 wait without an operation until the transfer source LPAR 150 is stopped.

The transfer source shadow LPAR 160 is provided with an L processor program 161, an LPAR program163, an EPT 164, an IRR table 165, and an ISR table 166. Each configuration of the transfer source shadow LPAR 160 executes processing equivalent to that of the same name of the transfer source LPAR 150 except that an operation related to the above described pending is not executed. The configuration of the transfer destination shadow LPAR 170 is equivalent to that of the transfer source shadow LPAR 160.

A live migration in accordance with an embodiment of the present invention will be described in detail in the following.

For the live migration, by duplicating the guest program 100 to the transfer destination physical computer 201, the guest program 100 seems to be migrated to the transfer destination physical computer 201. In this case, by reflecting a state of the memory 109 or the like of the transfer source virtual computer 104 that is managed by the transfer source LPAR 150 to the transfer destination virtual computer 107 of the transfer destination physical computer 201 by slow degrees, the transfer source virtual computer 104 seems to be migrated virtually.

Figure 2:
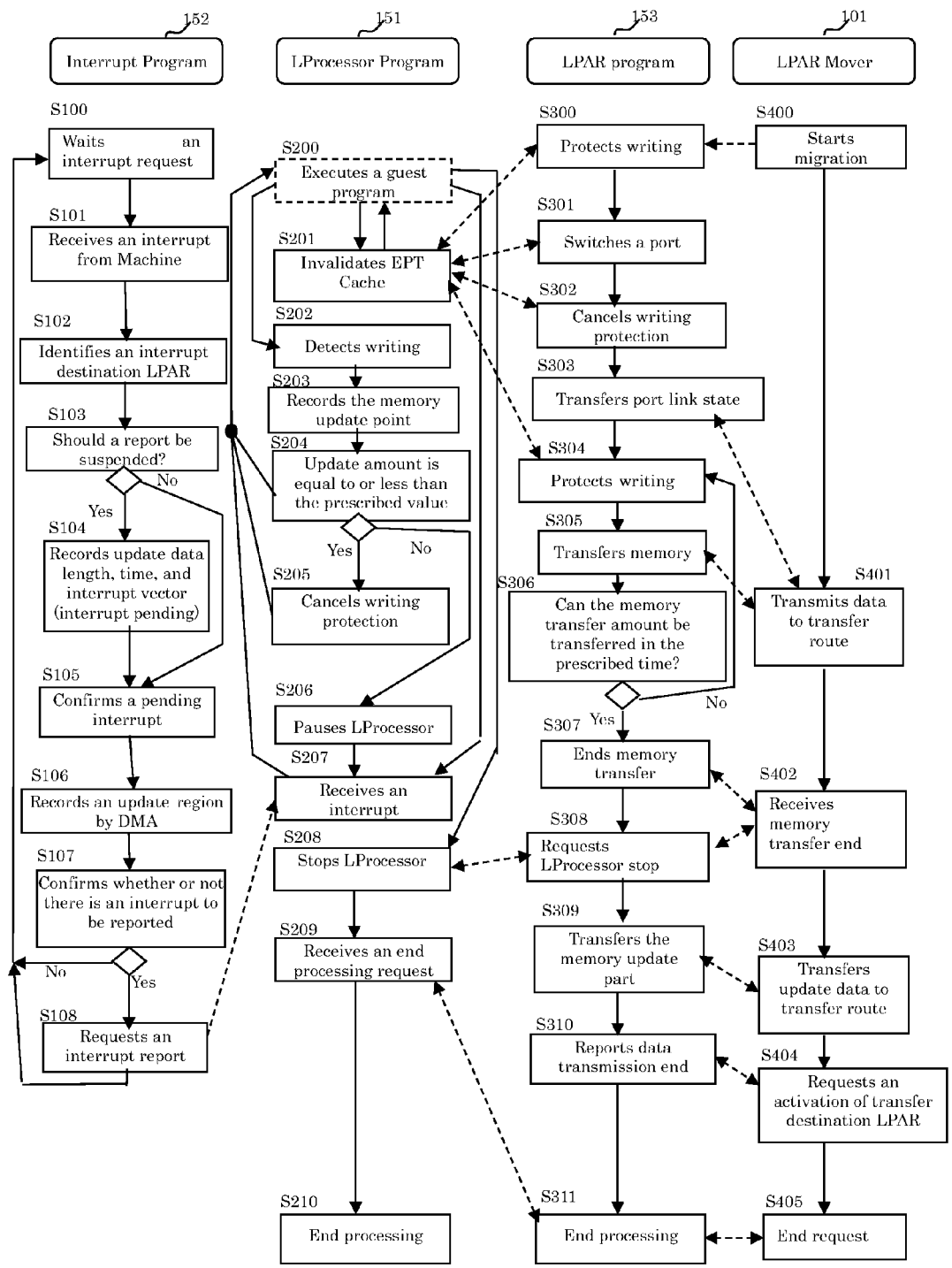
FIG. 2 is a flowchart of a processing that is executed by a program that is operated on a transfer source physical computer in accordance with an embodiment of the present invention.

FIG. 2 is a flowchart of a processing that is executed by a program that is operated on a transfer source physical computer in accordance with an embodiment of the present invention. In the figure, a processing for the live migration, that is, a duplicating processing of the transfer source virtual computer 104 is indicated as a flowchart in each program unit.

A processing that is executed by the interrupt program 155 will be described with reference to a flowchart on the most right side in FIG. 2.

An interrupt program 152 waits until an interrupt request of the transfer source physical computer 200 is issued (step S100). During this wait, the physical processor 201 does not make the interrupt program 152 run. In the case in which an interrupt request is issued from the transfer source physical computer 200, the physical processor 201 passes a control to the interrupt program 152 to operate the interrupt program 152.

The interrupt program 152 that has been operated by the physical processor 201 receives an interrupt from the transfer source physical computer 200 (step S101) and identifies an interrupt destination. LPAR (step S102). The identifying method of an interrupt destination LPAR (such as the transfer source LPAR 150 and the transfer source shadow LPAR 160) depends on a type of an interrupt (a number of an interrupt vector).

Here, an interrupt related to the HBA 212 will be described as an example in the following. In the case in which a request is sent to the HBA 212, when the L processor program 151 sends a request with an ID that indicates an NPIV (HBA vport) to which the request will be sent, an ID during the request time is stored into an identification register of the HBA 212 during a response to the request. Consequently, an NPIV that sends a response can be known based on the ID. Consequently, before a request is sent to the HBA 212, an ID of the HAB virtual port (HBA vport) that is to be used is corresponded to every LPAR (such as the transfer source LPAR 150 and the transfer source shadow LPAR 160). By this configuration, an LPAR in which an interrupt should be reported during a response can be identified based on an ID that has been stored into the specific register of the HBA 212.

After the interrupt destination LPAR is identified, the interrupt program 152 judges whether or not a report of the interrupt to the guest program 100 is suspended (step S103).

More specifically, the interrupt program 152 confirms a region that is not reflected to the transfer destination virtual computer 107 among the guest memory 109 of the transfer source virtual computer 104 in which the guest program 100 of a report target of an interrupt is operated, and judges whether or not data in a region that is not reflected can be transferred to the transfer destination virtual computer 107 within a predetermined time by using a data transfer route for a live migration (a transfer route for a migration). In the case in which the data can be transferred within a predetermined time, it is decided that it is not necessary that the report is suspended. On the other hand, in the case in which the data cannot be transferred within a predetermined time, it is decided that it is necessary that the report is suspended.

In the case in which it is assumed that a time that is not a problem even if the guest programs 100 and 103 are stopped in a live migration, that is, a time that is not a problem for a substantive execution of the guest programs 100 and 103 is 500 ms, a predetermined time that is the criteria of a judgment can be a time in which the contents of the guest memory 109 can be reflected to the transfer destination virtual computer 107 during a stoppage of the guest program 100 (such as 100 ms). The time that is not a problem even if the guest programs 100 and 103 are stopped can be a time in which the guest programs 100 and 103 are not stopped by the timeout detection in consideration of a disk seek time of the storage 231 and a timeout time in an OS.

In the case in which it is decided that the report should be suspended in the judgment of the step S103 (Yes in the step S103), the interrupt program 152 registers an interrupt vector that indicates an interrupt to be suspended to the pending interrupt table 157 (sets a bit that is corresponded to an interrupt vector of the pending interrupt table 157 to be 1) and stores a data length that has been updated by the DMA (an update data length) and the time at that time (a pending time) into the pending data table 156 (step S104). For instance, in the case in which the x86 series processor is used, a TSC (time stamp counter) can be used for a pending time. Moreover, in the case in which an SCSI device such as the HBA 212 is used, an update data length can be obtained from a value that has been set to an FCP_DL field (FCP data length field) that is defined by the Fibre channel protocol for SCSI standard by the guest program 100.

In the case in which there is an interrupt that has been suspended, the interrupt program 152 registers an update data length that is obtained by adding an update data length that is corresponded to an interrupt that is newly suspended to an interrupt that has been recorded to the pending data table 156 as a new update data length. The pending time is not modified from a pending time that has been recorded previously.

On the other hand, in the case in which it is decided that it is not necessary that the report is suspended in the judgment of the step S103 (No in the step S103), the interrupt program 152 judges whether or not there is an interrupt that has been suspended in the pending data table 156 (S105). In the case in which there is an interrupt that has been suspended, the pending time is calculated from a difference between a pending time of the pending data table 156 and the present time.

The interrupt program 152 compares a value that is obtained by dividing an update data length of the pending data table 156 by the pending time that has been calculated with a bandwidth of a transfer route for a migration. In the case in which a value that is obtained by dividing an update data length of the pending data table 156 by the pending time that has been calculated is larger than a bandwidth of a transfer route for a migration as a result of the comparison, the interrupt program 152 continues pending of an interrupt that has been suspended. On the other hand, in the case in which a value that is obtained by dividing an update data length of the pending data table 156 by the pending time that has been calculated is equal to or less than a bandwidth of a transfer route for a migration, the interrupt program 152 recognizes an interrupt that has been suspended as an interrupt that is judged that there is an interrupt that should be reported to the guest program 100 in the step S107 described later. Before the pending time becomes larger than an interrupt timeout time by the guest program 100, a pending of an interrupt must be canceled. Consequently, the interrupt program 152 send an interrupt to the guest program 100 before a timeout time of the guest program 100 regardless of a value that is obtained by dividing an update data length by the pending time and a value of a bandwidth of a transfer route for a migration.

For the live migration, after a writing protection is executed to a region of the guest memory 109 in the step S304 described later, it is necessary that the transfer source virtual computer 104 and the transfer destination virtual computer 107 are in the same state for the guest programs 100 and 103 by reflecting the transfer destination virtual computer 107 of the transfer destination physical computer 201 for a page in which the guest program 100 updates the guest memory 109. In order to implement such a state, it is necessary that an update of the guest memory 109 by the DMA is also reflected to the guest memory 141 of the transfer destination virtual computer 107 of the transfer destination physical computer 201 during an execution of the live migration.

In the present embodiment, the interrupt program 152 analyses a DMA table that the guest program 100 teaches to the HBA 212 in an interrupt of a DMA completion that is sent from the transfer source physical computer 200 to the interrupt program 152, identifies a beginning address and a size of a region of the guest memory 109 that is updated by the DMA, and records the contents of the update in order to reflect the update contents of the region to the guest memory 141 of the transfer destination virtual computer 107. In other words, in the case in which an interrupt is an interrupt of a DMA completion even if an interrupt is suspended or not suspended, the interrupt program 152 records a region of the guest memory 109 that has been updated to the EPT 154 (step S106). Since a method for recording a region of the guest memory 109 that has been updated to the EPT 154 is equivalent to a recording method in the case in which the physical processor 210 executes writing to the guest memory 109, the methods will be described later.

In the next place, the interrupt program 152 confirms whether or not there is an interrupt that should be reported to the guest program 100 (step S107). For instance as described above, in the case in which a value that is obtained by dividing an update data length of the pending data table 156 by the pending time is equal to or less than a bandwidth of a transfer route for a migration, it is judged that there is an interrupt that should be reported since the interrupt program 152 recognizes that there is an interrupt that should be reported to the guest program 100 in the step S107. Here, the case in which a value that is obtained by dividing an update data length of the pending data table 156 by the pending time is equal to or less than a bandwidth of a transfer route for a migration means that a data amount of data that has been updated for the guest memory 109 that is corresponded to an interrupt that is suspended is a data amount that can be transferred to the transfer destination physical computer 201 without a retention of data that has not been reflected in the guest memory 109.

In the case in which there is an interrupt that should be reported to the guest program 100 as a result (Yes in the step S107), the interrupt program 152 sets a bit of the IRR table 158 that is corresponded to the interrupt vector that indicates an interrupt that should be reported to be 1 and requests a report of an interrupt (step S108). In the case in which the interrupt program 152 sets a bit of the IRR table 158 that is corresponded to the interrupt vector that indicates an interrupt that should be reported to be 1, the interrupt program 152 sets a bit of the pending interrupt table 157 that is corresponded to the interrupt vector to be 1.

As a result, an interrupt is received by the L processor program 151 in the step 5207. In the case in which there is not an interrupt that should be reported to the guest program 100 (No in the step S107), the guest program 100 proceeds the processing to the step S100.

In the case in which a control is passed from the guest program 100 to the L processor program 151 and an interrupt enable is set to an interrupt flag of the virtual processor 108, the L processor program 151 confirms each bit of the IRR table 158. In the case in which a bit is set to be 1, a bit of the ISR table 159 that is corresponded to the interrupt vector that is provided with the highest priority level among interrupt vectors that are corresponded to a bit that is set to be 1 is set to be 1, and a bit of the IRR table 158 that is corresponded to the interrupt vector that has set a bit of the ISR table 159 to be 1 is set to be 0. When the L processor program 151 passes a control to the guest program 100, a control is passed to an interrupt handler of the guest program 100 for executing a processing to an interrupt that is indicated by an interrupt vector that is corresponded to a bit that has been set to be 1 for the ISR table 159.

In the next place, a DMA bandwidth control method of the HBA 212 will be described in the following. The DMA bandwidth control method is an example of a method for controlling a bandwidth of writing to the guest memory 109.

Figure 3:
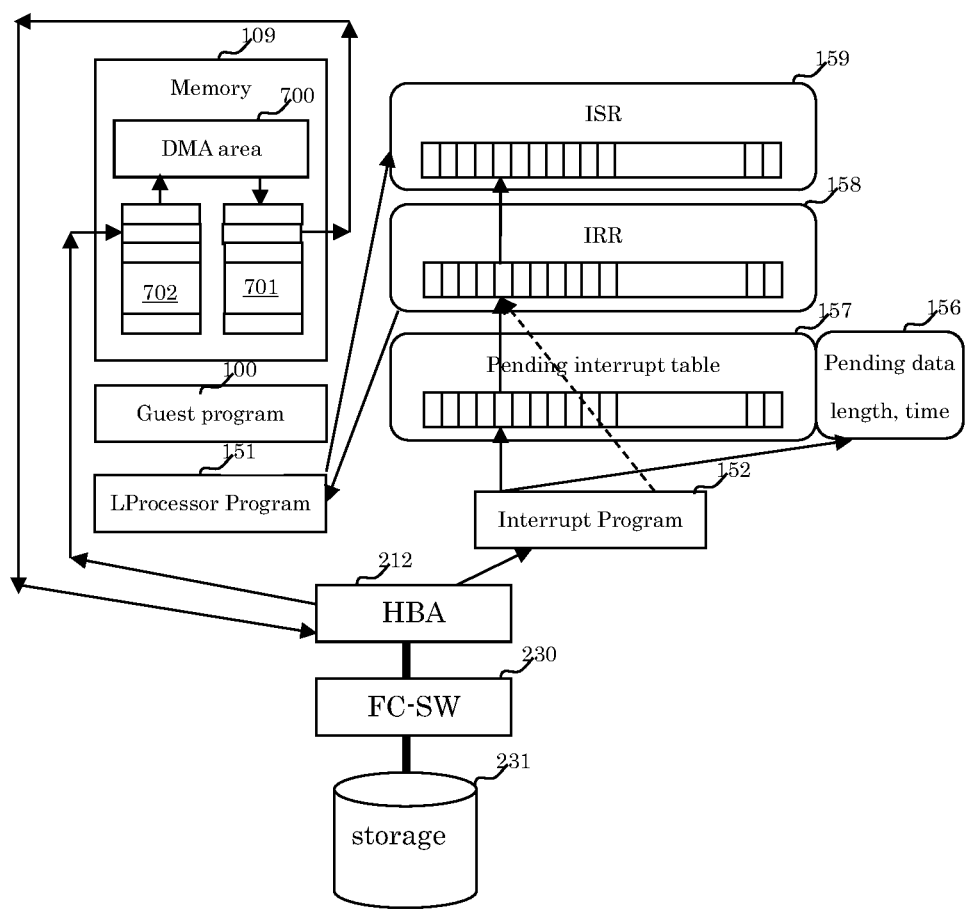
FIG. 3 is a first view for illustrating an HBA transfer processing in accordance with an embodiment of the present invention.
Figure 4:
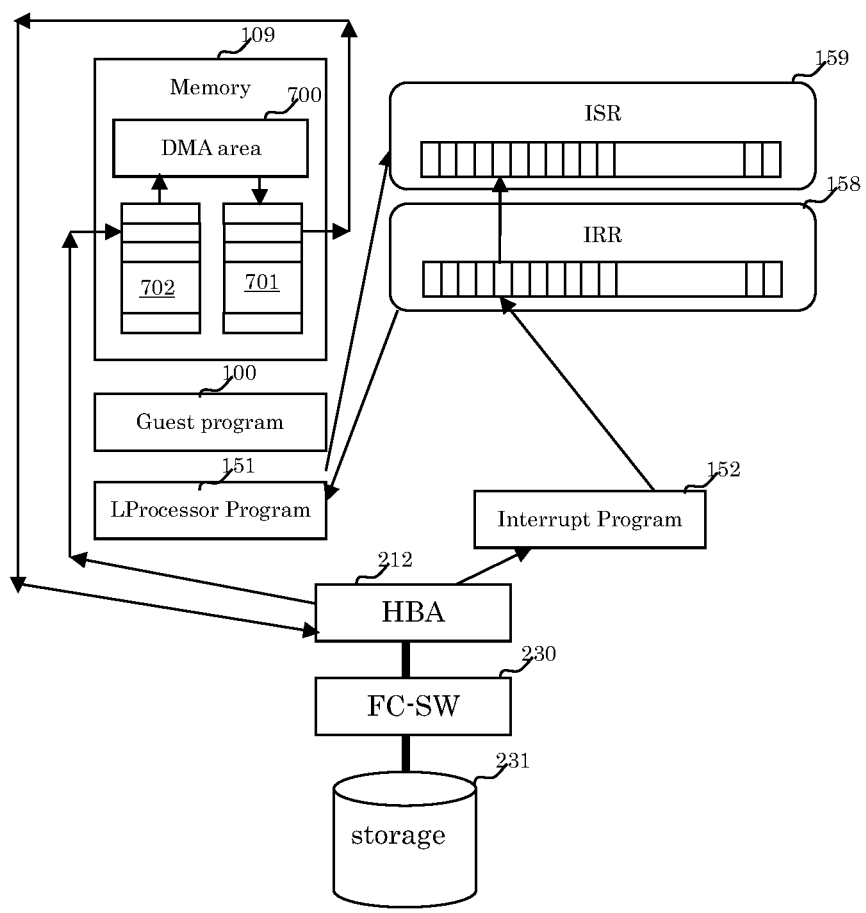
FIG. 4 is a second view for illustrating an HBA transfer processing in accordance with an embodiment of the present invention.

FIG. 3 is a first view for illustrating an HBA transfer processing in accordance with an embodiment of the present invention. FIG. 4 is a second view for illustrating an HBA transfer processing in accordance with an embodiment of the present invention.

FIG. 3 shows a relationship of each configuration in the case in which the DMA bandwidth control of the HBA 212 is executed, and FIG. 4 shows a relationship of each configuration in the case in which the DMA bandwidth control of the HBA 212 is not executed.

In the case in which the guest program 100 requests an SCSI command from the HBA 212, the guest program 100 sets a beginning address for the guest memory 109 of a request queue 701 for storing a request to the HBA 212 and a size of a request queue 701 to the HBA 212 before the request is issued. In addition, the guest program 100 sets a beginning address for the guest memory 109 of a response queue 702 for storing a response from the HBA 212 and a size of a response queue 702 to the HBA 212.

The request queue 701 and the response queue 702 will be described in the following.

Figure 7:
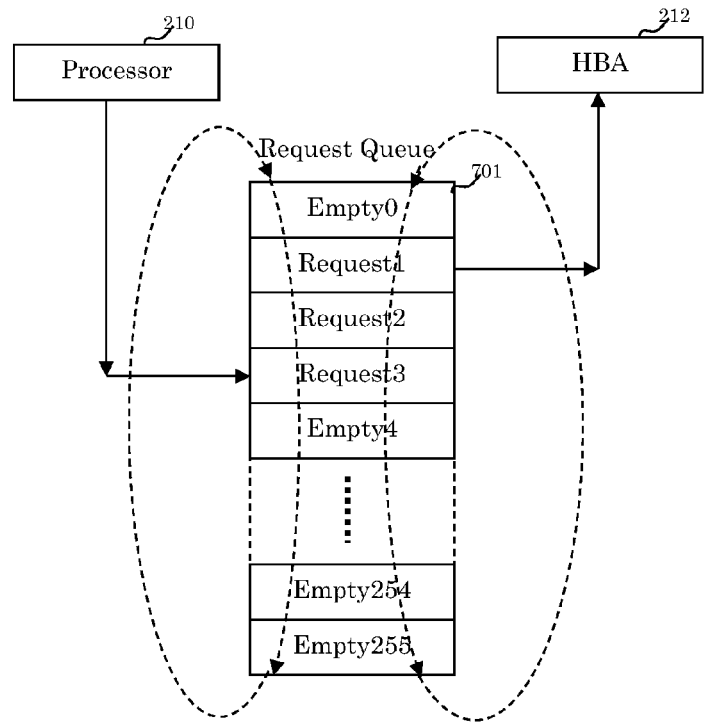
FIG. 7 is a first view for illustrating a request queue of an HBA in accordance with an embodiment of the present invention.
Figure 8:
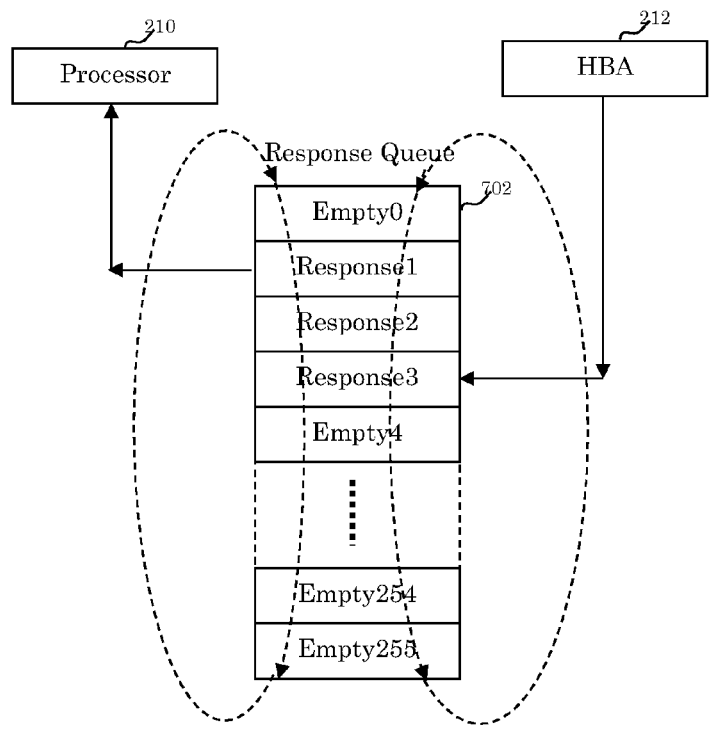
FIG. 8 is a first view for illustrating a response queue of an HBA in accordance with an embodiment of the present invention.
Figure 9:
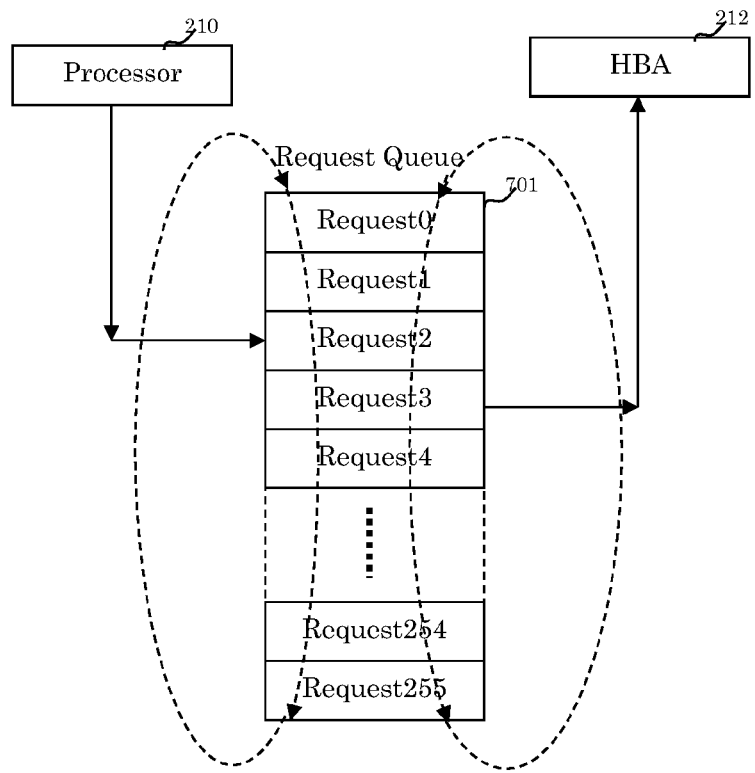
FIG. 9 is a second view for illustrating a request queue of an HBA in accordance with an embodiment of the present invention.
Figure 10:
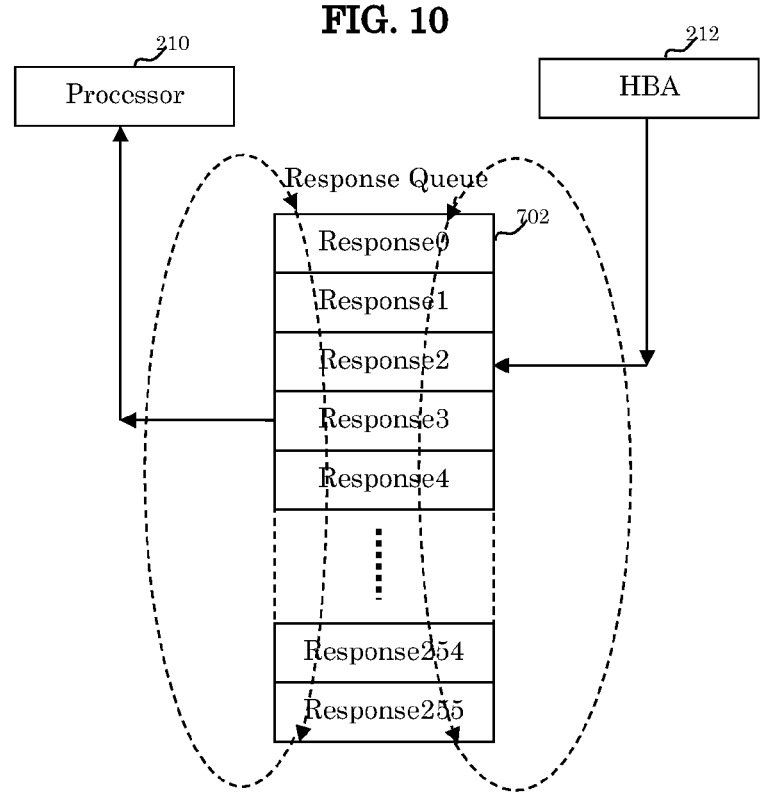
FIG. 10 is a second view for illustrating a response queue of an HBA in accordance with an embodiment of the present invention.

FIG. 7 is a first view for illustrating a request queue of an HBA in accordance with an embodiment of the present invention. FIG. 8 is a first view for illustrating a response queue of an HBA in accordance with an embodiment of the present invention. FIG. 9 is a second view for illustrating a request queue of an HBA in accordance with an embodiment of the present invention. FIG. 10 is a second view for illustrating a response queue of an HBA in accordance with an embodiment of the present invention.

As shown in FIG. 7, a processor 210 that executes the guest program 100 stores a request that is to be executed by the HBA 212 into an empty region next to a request on the tail end of the request queue 701. On the other hand as shown in FIG. 7, the HBA 212 acquires a leading request of the request queue 701 and executes a processing for acquiring data that is corresponded to the request from the storage 231.

In addition, as shown in FIG. 8, the HBA 212 stores a response that is a result of the processing of the request into an empty region next to a response on the tail end of the response queue 702. On the other hand, in the case in which a processor 210 that executes the guest program 100 receives a report to the response, the processor 210 acquires a leading response of the response queue 702.

Returning to the description of FIG. 3, in the case in which the interrupt program 152 receives an interrupt of a response from the HBA 212 (step S101 of FIG. 2), the interrupt program 152 judges whether or not a report of the response should be suspended (step S103 of FIG. 2). In the case in which the interrupt program 152 decides that the report should be suspended as a result (Yes in the step S103 of FIG. 2), the interrupt program 152 registers an interrupt vector that is corresponded to the response to the pending interrupt table 157 (sets a bit that is corresponded to the interrupt vector of the pending interrupt table 157 to be 1) and records an update data length and a pending time to the pending data table 156.

As a result, until it is decided that there is an interrupt that should be reported to the guest program 100 in the step S107 of FIG. 2 by the interrupt program 152, a bit of the IRR 158 that is corresponded to the interrupt vector that has been registered to the pending interrupt table 157 is not set to be 1, and a bit that is corresponded to the interrupt vector of the ISR 159 is not set to be 1.

By this configuration, since a response that is indicated by the interrupt vector is not reported to the processor 210 that executes the guest program 100, the guest program 100 does not take a response from the response queue 702. Consequently, a substantive bandwidth of data that is acquired by the guest program 100 can be reduced.

In the case in which a pending count of reports of an interrupt related to such a response is increased, the response queue 702 that has been prepared is filled with responses as shown in FIG. 10. As a result, since the HBA 212 cannot store a response that is a processing result of a request processing into the response queue 702, the HBA 212 stops acquiring new request from the request queue 701.

In the case in which the HBA 212 stops acquiring new request from the request queue 701 as described above, the request queue 701 is filled with requests after that as shown in FIG. 9. As a result, a request from the guest program 100 is stopped.

As described above, by suspending and delaying a report of a response of the DMA completion, a substantive transfer bandwidth of the DMA can be controlled and a transfer bandwidth of writing to the guest memory 109 due to the DMA transfer can be reduced.

On the other hand, in the case in which it is decided that a report should not be suspended as a result of the judgment of the step S103 (No in the step S103 of FIG. 2), since it is decided that there is an interrupt that is to be reported to the guest program 100 in the step S107 of FIG. 2, the interrupt program 152 sets a bit of the IRR 158 that is corresponded to an interrupt vector that indicates a report of a response to be 1 as shown in FIG. 4. By this configuration, after that, a bit that is corresponded to the interrupt vector of the ISR 159 is set to be 1, a report of a response is executed to the guest program 100, and the processor 210 that executes the guest program 100 acquires a leading response of the response queue 702.

Figure 5:
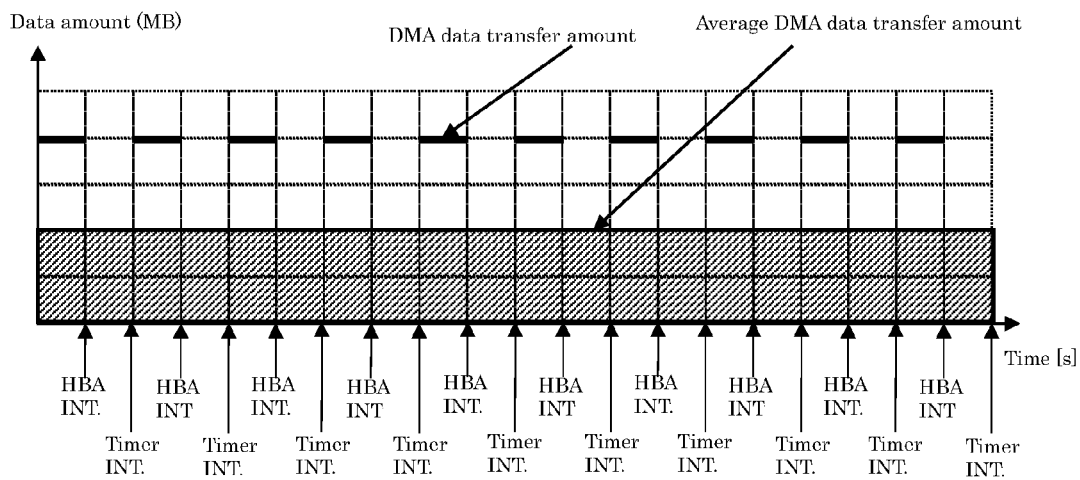
FIG. 5 is a first view for illustrating a relationship between a DMA data transfer amount and an average DMA data transfer amount in accordance with an embodiment of the present invention.
Figure 6:
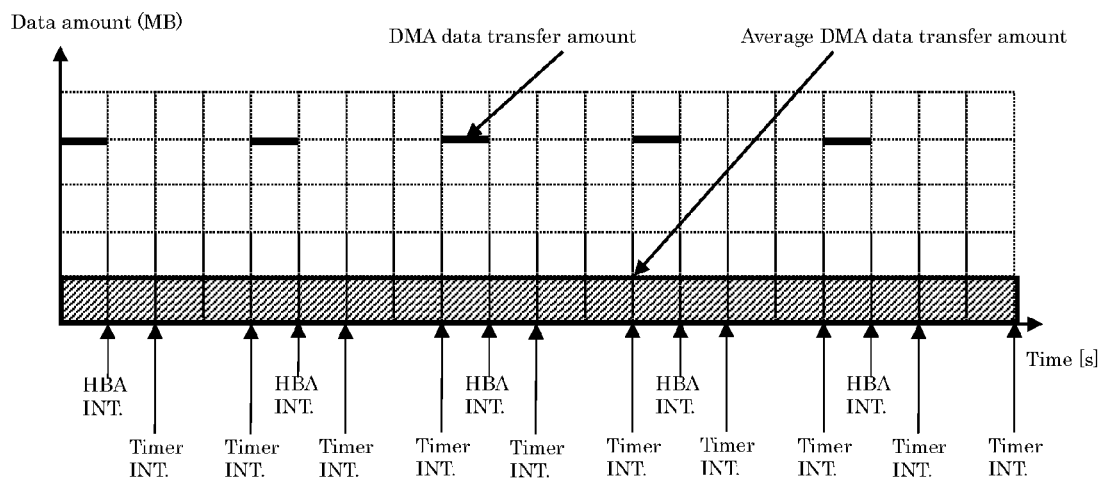
FIG. 6 is a second view for illustrating a relationship between a DMA data transfer amount and an average DMA data transfer amount in accordance with an embodiment of the present invention.

FIG. 5 is a first view for illustrating a relationship between a DMA data transfer amount and an average DMA data transfer amount in accordance with an embodiment of the present invention. FIG. 6 is a second view for illustrating a relationship between a DMA data transfer amount and an average DMA data transfer amount in accordance with an embodiment of the present invention.

FIG. 5 shows a relationship between a DMA data transfer amount and an average DMA data transfer amount in the case in which the interrupt pending control is not executed as shown in FIG. 4. FIG. 6 shows a relationship between a DMA data transfer amount and an average DMA data transfer amount in the case in which the interrupt pending control is executed as shown in FIG. 3. In FIG. 5 and FIG. 6, a horizontal axis indicates a time, and a point of time of the occurrence for an interrupt (HBA INT) by the HBA 212 and a point of time of the occurrence for a timer interrupt (Timer INT) by the processor 210 are shown on the horizontal axis. The HBA INT occurs in the case in which a response is reported to the interrupt program 152 after a request is processed. The timer interrupt occurs for every predetermined time for instance. The timer interrupt is an opportunity in the case in which an interrupt is reported to the guest program 100.

Even in FIG. 5 and FIG. 6, a data transfer amount of a DMA transfer (a DMA data transfer amount) to the guest memory 109 is the same for every when the HBA 212 processes on request.

In FIG. 5, in the case in which the interrupt program 152 receives the HBA INT for about a response, the interrupt program 152 reports the response to the guest program 100 by each time interrupt, and the next DMA transfer is executed by the HBA 212. Consequently, an average DMA data transfer amount that indicates a DMA data transfer amount per unit time is represented as shown in FIG. 5.

Here, in the case in which a live migration is executed and an average DMA data transfer amount is smaller than a bandwidth of a transfer route for a live migration (that is, a communication speed), all of data that has been updated by a DMA transfer for the guest memory 109 can be duplicated to the guest memory 141 of the transfer destination virtual computer 107 of the transfer destination physical computer 201. On the other hand, in the case in which an average DMA data transfer amount is larger than a bandwidth of a transfer route for a live migration, all of data that has been updated by a DMA transfer for the guest memory 109 cannot be duplicated to the guest memory 141 of the transfer destination virtual computer 107 of the transfer destination physical computer 201 and a part of data remains in the transfer source physical computer 200 (more specifically, the guest memory 109) unfortunately.

In FIG. 6, in the case in which the interrupt program 152 receives the HBA INT for about a response, a report of the HBA INT to the guest program 100 is suspended in some cases. Consequently, a request remains in the request queue 701 and a response remains in the response queue 702, whereby an execution of the DMA transfer is stopped on a temporary basis. As a result as shown in FIG. 6, an average DMA data transfer amount is smaller than an average DMA data transfer amount of FIG. 5. Therefore, even in the case in which all of data that has been updated by a DMA transfer cannot be duplicated to the transfer destination virtual computer 107 of the transfer destination physical computer 201 when an interrupt pending control is not executed, all of data that has been updated by a DMA transfer can be duplicated to the transfer destination virtual computer 107 of the transfer destination physical computer 201 in an appropriate manner by executing an interrupt pending control.

The bandwidth control method for a DMA transfer has been described above.

In the next place, a bandwidth control method of writing in a data update of the guest memory 109 by the physical processor 210 will be described in the following.

For the live migration, it seems that the guest programs 100 and 103 are not stopped, that is, the guest programs 100 and 103 are operated in a substantial way by shortening a time when the guest programs 100 and 103 are not operated. In the present embodiment, in such a manner that it seems that the guest programs 100 and 103 are operated in a substantial way, a stop time of the guest program 100 is equal to or less than 500 ms.

Since a stop time of the guest program 100 is shortened, the guest program 100 is operated during the live migration and the contents of the guest memory 109 are rewritten by the guest program 100 in some cases. For the live migration, it is necessary that the contents that have been rewritten in the guest memory 109 are also reflected to the guest memory 141 of the transfer destination virtual computer 107 on the transfer destination physical computer 201.

In addition, it is necessary that a data amount that is transmitted to reflect to the transfer destination virtual computer 107 is decreased after the guest program 100 is set to not be updated to the guest memory 109.

In the present embodiment, a data amount that is transmitted after the guest program 100 is set to not be updated to the guest memory 109 is a data amount that can be transferred to the transfer destination physical computer 201 within 100 ms for instance.

Moreover, a transfer of an internal state of the LPAR program 153 other than the guest memory 109 (a variable and a value of data that have been stored into a program for configuring the transfer source virtual computer 104) and other interrupt stop processing fall within a stop time (500 ms)–a transfer time of data related to the guest memory 109 (100 ms)=400 ms.

Returning to the description of FIG. 2, a processing of the LPAR program 153 will be described in the following. The processing of the LPAR program 153 is a flowchart that is second from the right in FIG. 2.

In the case in which the LPAR program 153 of a transfer source receives a starting instruction of the live migration from the transfer source LPAR mover 101 (step S400 in FIG. 2), the LPAR program 153 executes a writing protection to the guest memory 109. More specifically, in such a manner that a region in which the guest program 100 that is operated on the transfer source virtual computer 104 writes to the guest memory 109 is known, the LPAR program 153 reports a write exception to the physical processor 210 and makes a control being switched from the guest program 100 to the L processor program 151 (step S300).

The EPTs (154, 164, 174, and 184) that are managed by the physical processors 210 and 220 will be described in the following.

The physical processors 210 and 220 define a correspondence relationship between an address (a guest address: an address of a memory, a device or the like that is recognized by a program) of the guest memories (109, 121, 131, and 141) that are used by the programs (100, 101, 102, and 103) that are operated on the virtual computers (104, 105, 106, and 107) and an address (a hypervisor address: an address of a memory, a device or the like that is recognized by a hypervisor) that is used by the hypervisors (190 and 191) to the EPTs (154, 164, 174, and 184). In other words, a guest address can be converted to a hypervisor address by using the EPTs (154, 164, 174, and 184).

Figure 12:
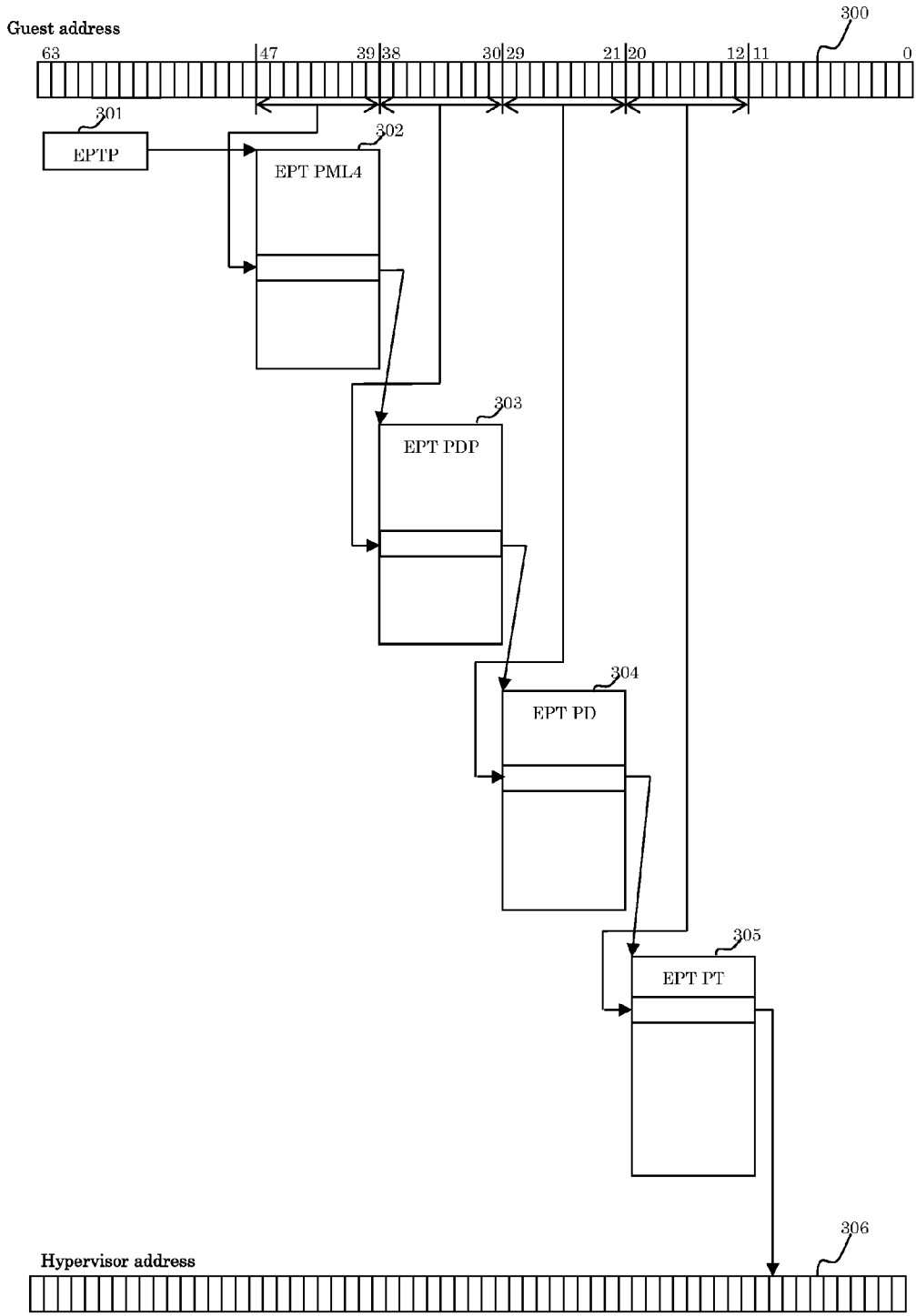
FIG. 12 is a view for illustrating an EPT in accordance with an embodiment of the present invention.

FIG. 12 is a view for illustrating an EPT in accordance with an embodiment of the present invention. FIG. 12 shows an EPT in the case in which a guest address and a hypervisor address are converted to each other in a unit of 4 KB.

As shown in FIG. 12, the EPTs (154, 164, 174, and 184) are configured by a plurality of tables of a plurality of stages (such as 4 stages). Since the configurations of the EPT 154, the EPT 164, the EPT 174, and the EPT 184 are equivalent to each other, the EPT 154 will be described as an example in the following. The EPT 154 is provided with an EPT PML4 table 302, at least one EPT PDP table 303, at least one EPT PD table 304, and at least one EPT PT table 305 in order from the table of the upper level stage. In addition, The EPT 154 is provided with an EPTP (extended page table pointer) 301.

The EPTP 301 stores a beginning hypervisor address (only bit group of bits from the 12th bit to the 51st bit of the hypervisor address) in which the EPT PML4 table 302 has been stored. The bits from the 52nd bit to the 63rd bit of the hypervisor address are 0, and the bits from the 0th bit to the 11th bit are offset (the same as the bit group of bits from the 0th bit to the 11th bit of the guest memory 300). Consequently, a hypervisor can be identified by the bit group of bits from the 12th bit to the 51st bit of the hypervisor address that has been stored into the EPTP 301.

Each one of the tables (302, 303, 304, and 305) of each stage is in size of 4 KB for instance, and 512 entries (registration lines) are stored into each table for instance. A size of an index that indicates an entry of each table is 9 bits since there are 512 entries.

An entry that is used for a conversion to the hypervisor address 306 among 512 entries of each table is identified based on an index that has been stored in the predetermined range of the guest address 300. An index of the EPT PML4 table 302 (an EPT PML4 table index) is the bit group of bits from the 47th bit to the 39th bit of the guest address 300. An index of the EPT PDP table 303 (an EPT PDP table index) is the bit group of bits from the 38th bit to the 30th bit of the guest address 300. An index of the EPT PD table 304 (an EPT PD table index) is the bit group of bits from the 29th bit to the 21st bit of the guest address 300. An index of the EPT PT table 305 (an EPT PT table index) is the bit group of bits from the 20th bit to the 12st bit of the guest address 300.

Each entry of the EPT PML4 table 302 has stored a beginning hypervisor address (a bit group of bits from the 12th bit to the 51st bit of the hypervisor address) of the EPT PDP table 303, which should be referred to in a conversion of a guest address that includes the EPT PML4 table index that indicates the entry.

Each entry of the EPT PDP table 303 has stored a beginning hypervisor address (a bit group of bits from the 12th bit to the 51st bit of the hypervisor address) of the EPT PD table 304, which should be referred to in a conversion of a guest address that includes the EPT PDP table index that indicates the entry.

Each entry of the EPT PD table 304 has stored a beginning hypervisor address (a bit group of bits from the 12th bit to the 51st bit of the hypervisor address) of the EPT PT table 305, which should be referred to in a conversion of a guest address that includes the EPT PD table index that indicates the entry.

Figure 13:
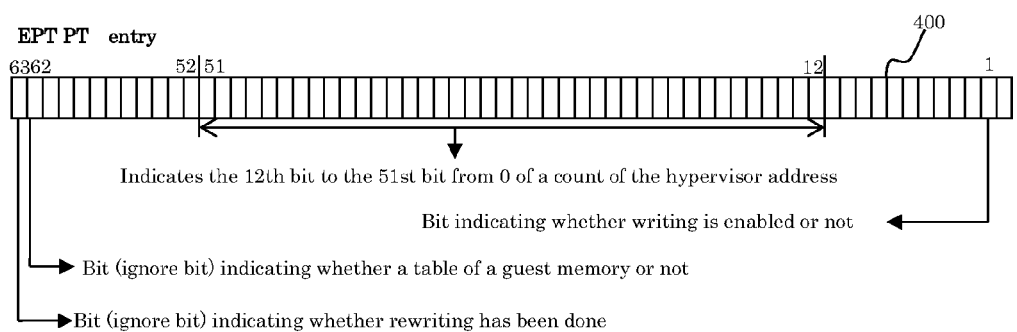
FIG. 13 is a view for illustrating an entry of an EPT PT table in an EPT in accordance with an embodiment of the present invention.

FIG. 13 is a view for illustrating an entry of an EPT PT table in an EPT in accordance with an embodiment of the present invention.

Each entry of the EPT PT table 305 has stored a hypervisor address (a bit group of bits from the 12th bit to the 51st bit of the hypervisor address) that is corresponded to a guest address that includes the EPT PD table index that indicates the entry.

The first bit of the entry (EPT PT entry) 400 of the EPT PT table 305 is a bit that indicates whether or not data writing to a region that is indicated by the entry is enabled. In the case in which this bit is 0, a region that is indicated by the entry is a target of a writing protection (writing is disabled). In the case in which the guest program 100 tries to execute writing to a region that is corresponded for the guest memory 109, a writing exception is reported to the physical processor 210, and a control is passed from the guest program 100 to an L processor program 153. However, a writing exception is reported to the physical processor 210 in the case in which writing is executed to a space (a page) of 4 KB that is corresponded to a guest address that can be converted by the EPT PT entry 400 among the guest memory 109. In the step S300 in FIG. 2, 0 is set to the first bit of the EPT PT entry 400 by the LPAR program 153.

In the present embodiment, the information described in the following is put in an ignore bit of the EPT 154 that is ignored by the physical processors 210 and 220 for the EPT PT entry 400. The ignore bit is a bit that is ignored by the physical processors 210 and 220. Consequently, even in the case in which the value is 1 or 0, an operation of the physical processors 210 and 220 is not influenced.

As a guest address, there are two types of an address that indicates the guest memories (109, 121, 131, and 141) and an address that indicates an MMIO (memory mapped input output: input/output devices that has been allocated to a guest address space) for registers such as HBA (212 and 223) and NIC (213 and 222).

In the present embodiment, a guest memory region is much larger than an MMIO region. Moreover, since there is the guest programs 100 and 103 that are provided with a large data update amount, the guest memory region is provided with a data update amount larger than that of the MMIO region. In the present embodiment therefore, a bandwidth restriction is executed for a guest memory region.

Each of a guest memory region and an MMIO region is allocated to the EPT 154. It is thought that a region that is allocated to an address of the EPT 154 can be judged by a hypervisor address and a guest address that are handled by the EPT 154 as a method. However in the present embodiment, in such a manner that a guest memory region can be easily and rapidly known only by the information of the EPT 154, an ignore bit for an entry of the EPT 154 is set as a bit for indicating a guest memory region or an MMIO region (or an undefined region).

In the present embodiment as shown in FIG. 13, the 62nd bit of the EPT PT entry 400 is a bit for indicating a guest memory region or an MMIO region (or an undefined region). In the present embodiment, a guest memory region is indicated in the case in which the bit is 1, and an MMIO region (or an undefined region) is indicated in the case in which the bit is 0.

In the present embodiment moreover, an ignore bit of an entry of the EPT 154 is a bit for indicating whether or not an update to a region that is indicated by the guest memory 109 is reflected to the transfer destination virtual computer 107 by the guest program 100.

In the present embodiment as shown in FIG. 13, the 63rd bit of the EPT PT entry 400 is a bit for indicating whether or not an update is reflected to the transfer destination virtual computer 107. In the present embodiment, an update of a region that is corresponded to the entry is not reflected to the transfer destination virtual computer 107 in the case in which the bit is 1, and an update of a region that is corresponded to the entry is reflected to the transfer destination virtual computer 107 or the live migration has not been executed in the case in which the bit is 0. The 63rd bit of the EPT PT entry 400 is also used to indicate that an update by writing is not reflected to the transfer destination virtual computer 107 in the case in which the writing is executed to the guest memory 109 by the DMA transfer.

The case in which a guest address and a hypervisor address are converted to each other in a unit of 4 KB has been described above. For instance, a guest address and a hypervisor address can also be converted to each other in a unit of 2 MB. In this case, it is not necessary that the EPT 154 is provided with the EPT PT table 305. Moreover, an entry of the EPT PD table 304 can be as follows.

Figure 14:
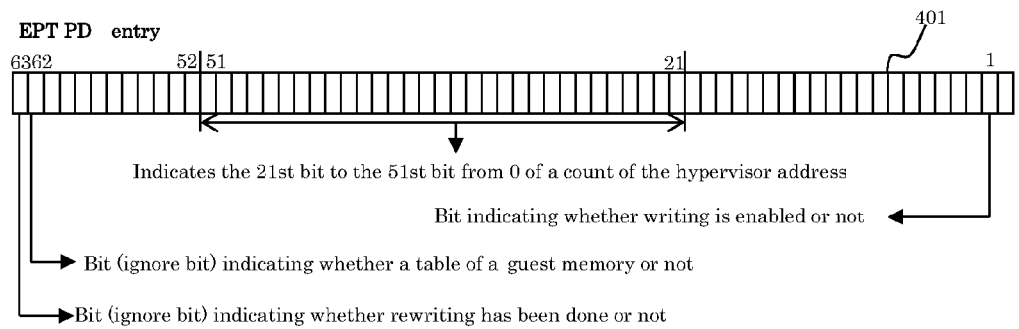
FIG. 14 is a view for illustrating an entry of an EPT PD table in an EPT in accordance with an embodiment of the present invention.

FIG. 14 is a view for illustrating an entry of an EPT PD table in an EPT in accordance with an embodiment of the present invention. FIG. 14 shows an entry of the EPT PD table in the case in which a guest address and a hypervisor address are converted to each other in a unit of 2 MB.

1 has been stored into the 7 bit of the entry (the EPT PD entry) 401 of the EPT PD table 304, and a hypervisor address (a bit group of bits from the 21st bit to the 51st bit of the hypervisor address) that is corresponded to a guest address that includes the EPT PD table index that indicates the entry has been stored into the 21st bit to the 51st bit. For the hypervisor address that is corresponded to a guest address, bits from the 52nd bit to the 63rd bit are 0, bits from the 0 bit to the 20th bit are offset (equivalent to a bit group of bits from the 0 bit to the 20th bit of the guest memory 300), and bits from the 20th bit to the 51st bit are a bit group of bits from the 21st bit to the 51st bit that are included in the entry that has been referred to by the EPT PD table 304.

The 1st bit of the EPT PD entry 401 is a bit for indicating whether or not writing is enabled to a region that is corresponded to an entry. In the case in which this bit is 0, a region that is corresponded to an entry is a target of a writing protection (writing is disabled). In the case in which the guest program 100 executes writing to the region of the guest memory 109, a write exception is reported to the physical processor 210 and a control is passed from the guest program 100 to the L processor program 153. However, a write exception is reported to the physical processor 210 only in the case in which writing is executed to a space (a page) of 2 MB of a guest address that can be converted by the EPT PD entry 401 for the guest memory 109.

In addition, the 62nd bit of the EPT PD entry 401 is a bit for indicating a guest memory region or an MMIO region (or an undefined region). In the present embodiment, a guest memory region is indicated in the case in which the bit is 1, and an MMIO region (or an undefined region) is indicated in the case in which the bit is 0.

In addition, the 63rd bit of the EPT PD entry 401 is a bit for indicating whether or not an update of a region that is corresponded to an entry is reflected to the transfer destination virtual computer 107. In the present embodiment, an update of a region that is corresponded to the entry is not reflected to the transfer destination virtual computer 107 in the case in which the bit is 1, and an update of a region that is corresponded to the entry is reflected to the transfer destination virtual computer 107 or the live migration has not been executed in the case in which the bit is 0. The 63rd bit of the EPT PD entry 401 is also used to indicate that an update of a region that is corresponded to the entry is not reflected to the transfer destination virtual computer 107 in the case in which the writing is executed to the guest memory 109 by the DMA.

Returning to the description of FIG. 2, after the writing disable setting is executed to the EPT 154 in the step S300, the physical processor 210 (the L processor program 151) invalidates EPT cache entries that temporarily store the conversion result of the guest address and the hypervisor address (step S201).

Moreover, after the writing disable setting is executed to the EPT 154 in the step S300, the LPAR program 153 executes the switching of a real HBA virtual port 111 and a dummy HBA virtual port 112 (step S301).

The switching operation of the real HBA virtual port 111 and the dummy HBA virtual port 112 will be described in detail in the following.

Figure 17:
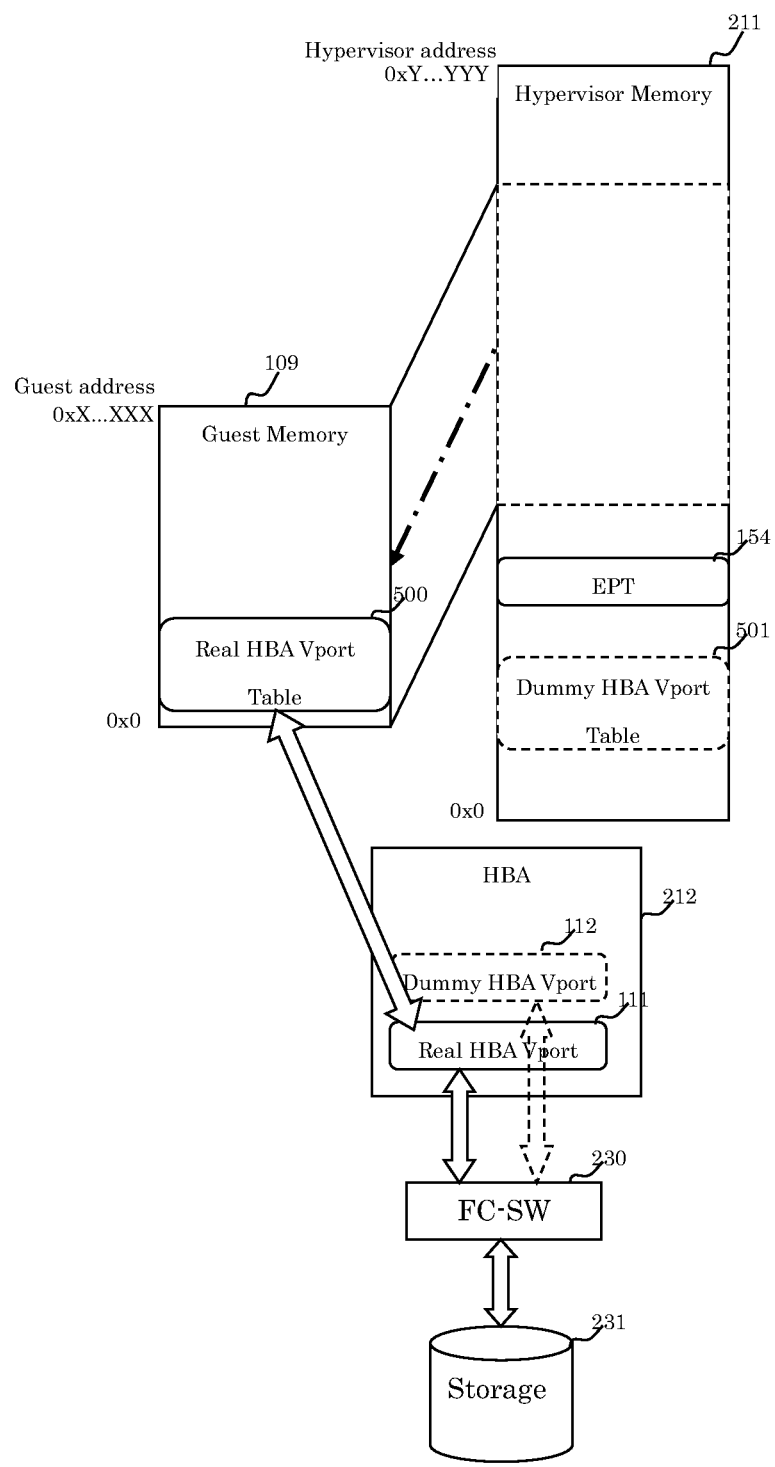
FIG. 17 is a view showing a correspondence relationship between a guest address and a hypervisor address in using a real HBA virtual port in accordance with an embodiment of the present invention.
Figure 18:
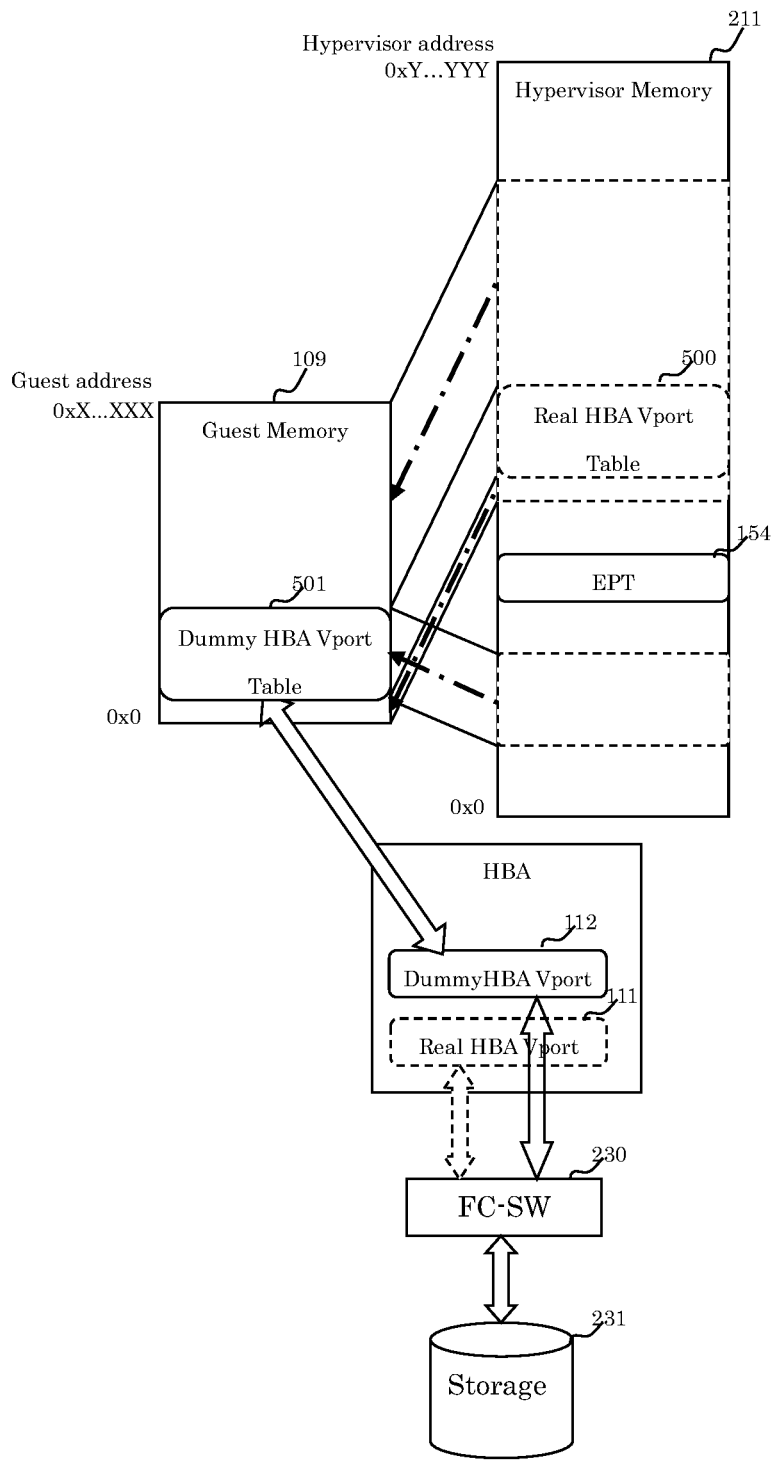
FIG. 18 is a view showing a correspondence relationship between a guest address and a hypervisor address in using a dummy HBA virtual port in accordance with an embodiment of the present invention.

FIG. 17 is a view showing a correspondence relationship between a guest address and a hypervisor address in using a real HBA virtual port in accordance with an embodiment of the present invention. FIG. 18 is a view showing a correspondence relationship between a guest address and a hypervisor address in using a dummy HBA virtual port in accordance with an embodiment of the present invention.

As shown in FIG. 17, in the case in which the real HBA virtual port 111 is used, a real virtual port control table 500 that stores the control information related to the real HBA virtual port 111 is stored into the guest memory 109. In addition, the dummy virtual port control table 501 that stores the control information related to the dummy HBA virtual port 112 is stored into a region that is different from the guest memory 109 of the hypervisor memory 211.

Here, after the writing disable setting is executed to the EPT 154 in the step S300, the physical processor 210 can detect that the guest program 100 has written to the real virtual port control table 500 of the HBA 212.

In the first place, after the LPAR program 153 makes a state of the dummy HBA virtual port 112 equivalent to a virtual port link state of the real HBA virtual port 111 that is executing a login to the FC-SW 230, the LPAR program 153 implement a state capable of detecting the writing to the real virtual port control table 500. In the case in which writing from the guest program 100 is not executed, the LPAR program 153 duplicates all the contents of the real virtual port control table 500 to the dummy virtual port control table 501.

In the next place, in the case in which the contents of the dummy virtual port control table 501 and the contents of the real virtual port control table 500 are equivalent to each other, the LPAR program 153 rewrites the EPT 154 and executes a switching in such a manner that a hypervisor address that is corresponded to a guest address of the real virtual port control table 500 is corresponded to a hypervisor address of the dummy virtual port control table 501 as shown in FIG. 18.

By this the switching of a correspondence relationship between the guest address and the hypervisor address, it is possible to replace a guest memory region that the guest program 110 recognizes as the real virtual port control table 500 with a region that the HBA 212 recognizes as the dummy virtual port control table 501.

By this configuration, although the guest program 100 recognizes that a request is issued to the real virtual port control table 500, a request is issued to the dummy virtual port control table 501 in a practical sense. A data flow can be switched from the real HBA virtual port 111 to the dummy HBA virtual port 112 without being recognized by the guest program 100.

Here, in the case in which a port is switched by an operation of the EPT 154 by the hypervisor 190, it is necessary to execute switching in a state in which the contents of the real virtual port control table 500 of the HBA 212 and the contents of the dummy virtual port control table 501 are equivalent to each other. In the case in which writing is executed to the real virtual port control table 500 by the guest program 100, it is necessary that the contents of the real virtual port control table 500 is duplicated to the dummy virtual port control table 501 again.

Similarly to the case in which the guest program 100 executes a bandwidth control of the writing to the guest memory 109, a bandwidth control of the writing to the real virtual port control table 500 is then executed. The bandwidth control of the writing will be described with reference to FIG. 2 in the following.

In the case in which the guest program 100 that is executed in the step S200 executes the writing to the guest memory 109, when a region of a writing target is set to a writing protection (writing disabled), a control is passed to the L processor program 151 and writing is detected (step S202).

In the case in which the L processor program 151 that has detected the writing manages a guest address in a unit of 4 KB, 1 that indicates that writing has occurred in a writing protection is recorded to the 63rd bit of the EPT PT entry 400 that is corresponded to a region of the writing target (the 63rd bit of the EPT PD entry 401 in the case in which a guest address is managed in a unit of 2 MB) (step S203).

After the step S203, the L processor program 151 compares a data amount of a region that has not reflected to the transfer destination physical computer 201 and an amount of data that can be transmitted to the transfer destination physical computer 201 within a specified time with each other (such as 100 ms) (step S204). In the case in which a data amount of a region that has not reflected to the transfer destination physical computer 201 is larger as a result of the comparison, the L processor program 151 still makes the region to be in a writing disabled state and records the guest address of the region and a time of that (such as tsc) to the pending data table 156. In addition, the L processor program 151 makes itself to be in a quiescent mode of operation (a state in which an instruction in a program is not executed by the physical processor 210) (step S206).

The L processor program 151 that is in a quiescent mode of operation is woken up by an interrupt that is issued on a periodic basis by a timer or an interrupt that is issued by an HBA 212 (step S207). The L processor program 151 that has been woken up by an interrupt returns a control to the guest program 100 in order to report the interrupt (step S200).

In the case in which the guest program 100 writes to a writing disabled region after a processing for reporting an interrupt to the guest program 100 is executed, a control is passed to the L processor program 151 again (step S202). After that, the L processor program 151 again calculates a difference between a time tsc of this time and a time tsc that has been recorded to the pending data table 156 in the step S204 that has been executed previously (step S204).

In the case in which the difference is a time in which data of 4 KB can be sufficiency transferred to the transfer destination physical computer 201, the L processor program 151 cancels the writing disable for the first bit of the EPT PT entry 400 that is corresponded to a region that has not been reflected, and modifies to the writing enable (step S205). In the case in which a transfer route via an Ethernet switch 232 is a transfer route that is provided with a theoretical transfer bandwidth of 1 Gbps for instance, when the time is equal to or larger than 40 us, the data of 4 KB can be sufficiency transferred. Consequently, in the case in which the difference is equal to or larger than 40 us, it is decided that the difference is a time in which the data can be sufficiency transferred.

Moreover, it is necessary to consider the writing by the DMA and the number of virtual processors 108 that seems virtually by the guest program 100.

In the present embodiment, the L processor program 151 counts the number of virtual processors 108 that has suspended the writing end interrupt from the DMA, calculates a value that is obtained by multiplying 40 us by the number of virtual processors 108 that has been suspended, and sets a value that is obtained by adding 40 us to the value that has been calculated to be the standard of time in which data can be sufficiency transferred.

Even in the case in which a sufficient time has not elapsed from when an interrupt was suspended, there is a possibility that a time of the guest program 100 is wrong when the guest program 100 does not execute a processing of a timer interrupt. Consequently, in the case in which it can be recognized that the guest program 100 is executing a processing of an interrupt, the L processor program 151 cancels the writing disable and passes a control to the guest program 100.

Figure 15:
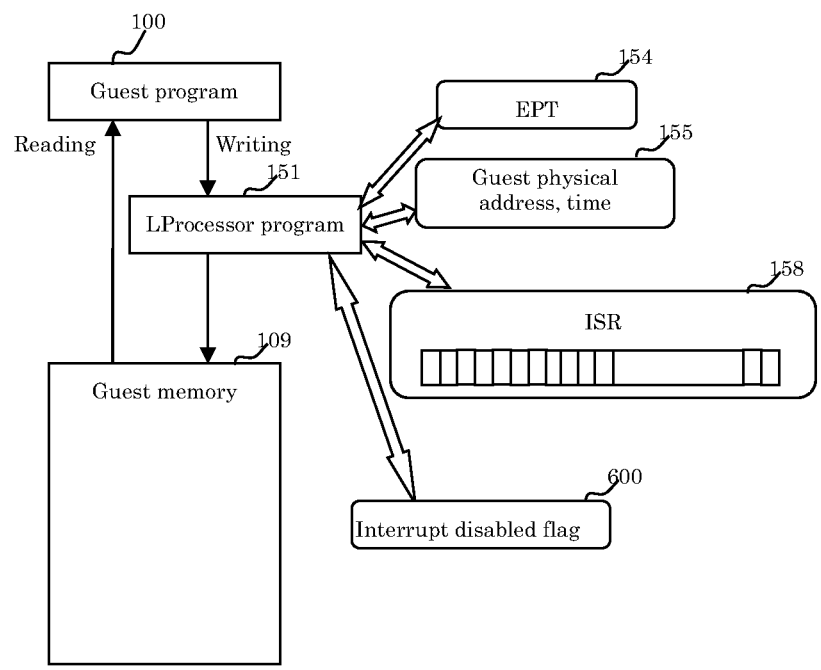
FIG. 15 is a first view for illustrating a writing processing to a guest memory by a guest program in accordance with an embodiment of the present invention.
Figure 16:
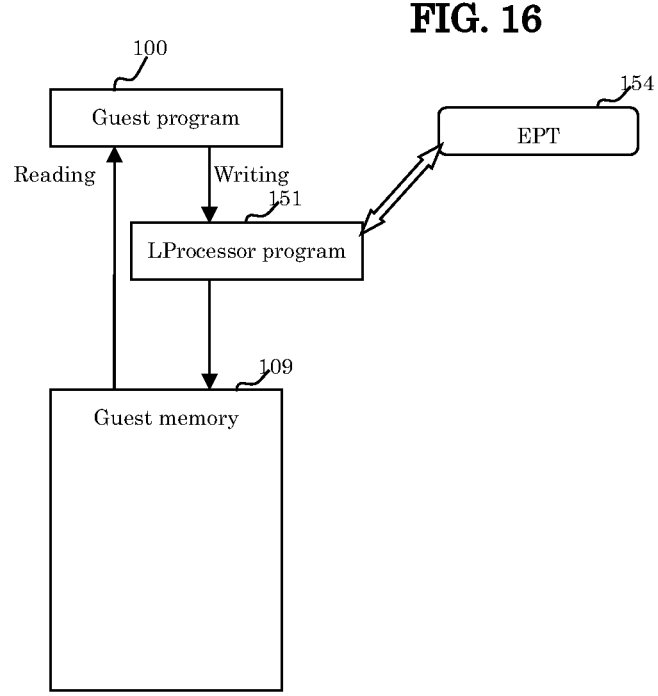
FIG. 16 is a second view for illustrating a writing processing to a guest memory by a guest program in accordance with an embodiment of the present invention.

FIG. 15 is a first view for illustrating a writing processing to a guest memory by a guest program in accordance with an embodiment of the present invention. FIG. 16 is a second view for illustrating a writing processing to a guest memory by a guest program in accordance with an embodiment of the present invention. FIG. 15 shows a state in which a bandwidth control of writing is executed to the guest program 100, and FIG. 16 shows a state in which a bandwidth control of writing is not executed to the guest program 100.

As shown in FIG. 15, it can be judged that the guest program 100 is in the interrupt processing by the case in which a guest address that has recorded data is incongruous with a guest address that has caused the switching from the guest program 100 to the L processor program 151, the case in which an interrupt disable state flag 600 has been set to the virtual processor 108, or the case in which a bit that is corresponded to an interrupt vector of the ISR table 159 is not 0. The interrupt disable state flag 600 is set by the guest program 100. In the case in which the flag is 1, it is indicated that an interrupt report is enabled. In the case in which the flag is 0, it is indicated that an interrupt report is disabled. The interrupt disable state flag 600 is an internal variable that is held by the L processor program 151, and seems virtually as an internal register of the virtual processor 108.

Since the number of the guest address tables 155, the pending interrupt tables 157, the IRR tables 158, and the ISR tables 159 that have been prepared is equivalent to the number of the virtual processors 108 that seems virtually to the guest program 100, the judgment of the number of the virtual processors 108 that have suspended an interrupt and a control of an interrupt for every virtual processor 108 can be executed.

As described above, by controlling a time in which the writing disable state is changed to the writing enable state for a region in which writing has occurred, a bandwidth of a data amount that the guest program 100 writes to the guest memory 109 in a certain period of time can be controlled (for instance, a bandwidth of a data amount can be reduced).

The processing after the step S301 in FIG. 2 will be described without any interruption in the following.

After the LPAR program 153 switches a virtual port that is used in the step S301, before the LPAR program 153 transfers a link state of the dummy HBA virtual port 112 (a state in which a login is executed to the FC-SW 230 and a read and a write to an LU are enabled) to the transfer destination physical computer 201, since it is not necessary to detect the writing to the guest memory 109 in the case in which a link state of a virtual port is transferred, the LPAR program 153 cancels the writing protection to the guest memory 109 in this period of time (step S302). Since the EPT 154 is also rewritten in the case in which the writing protection is canceled, the physical processor 210 (the L processor program 151) invalidates a cache that temporarily stores the conversion result of the guest address and the hypervisor address (step S201).

It is necessary that the guest memory 109 is reflected to the transfer destination virtual computer 107 after the link information of a virtual port is transferred. Consequently, in order to detect a guest memory region that has not been reflected, the LPAR program 153 modifies the configuration of the EPT 154 again, sets the guest memory region to be in a state of the writing disable (in a writing protection state), and sets a state in which an update to the guest memory 109 by the guest program 100 can be detected (step S304).

In the next place, the LPAR program 153 transmits all data of the guest memory 109 to the transfer destination virtual computer 107 and then transmits data of a region that has been rewritten, that is, a region in which the 63rd bit of the EPT PT entry 400 or the EPT PD entry 401 is 1 to the transfer destination virtual computer 107 (step S305). In the step S305, since it can be judged that rewriting has not been executed in a data transfer for a region in which the 63rd bit of the EPT PT entry 400 or the EPT PD entry 401 is 1 and a state of the writing disable (that is, the first bit is 0) is set, the LPAR program 153 modifies the 63rd bit of the EPT PT entry 400 or the EPT PD entry 401 from 1 to 0.

The transfer source LPAR mover 101 that has received a transfer request from the LPAR program 153 to the guest memory 109 transmits data to a transfer route that is used for the live migration (such as a transfer route via an Ethernet switch 232) (step S401).

After all regions of the guest memory 109 have been transferred in the step S305, the LPAR program 153 compares a data amount of data that is not reflected to the transfer destination virtual computer 107 and a bandwidth of a transfer route that is used in the live migration with each other, and judges whether or not the data that is not reflected can be transferred within 100 ms (step S306).

In the case in which it is judged that the data can be transferred as a result of the judgment (Yes in the step S306), the LPAR program 153 completes the data transfer from the guest memory 109 (a memory transfer) and notifies the transfer source LPAR mover 101 of a completion of a memory transfer (step S307). The transfer source LPAR mover 101 receives the completion of the memory transfer (step S402).

In the next place, the LPAR program 153 executes a stop request of a program to the L processor program 151 (step S308). The stopping of the L processor program 151 means making the L processor program 151 to be in a state in which an execution of an instruction cannot be done and in a state in which the guest program 100 is not executed again even to an interrupt request from the interrupt program 152.

The L processor program 151 that has received the stop request from the LPAR program 153 becomes in a stopping state (step S208). In the case in which the L processor program 151 is in a stopping state as described above, since the guest program 100 also cannot be operated, an update to the guest memory 109 is not executed. In addition, for the writing to the guest memory 109 by the DMA, since there is not a new request of a DMA transfer, the writing to the guest memory 109 is not executed in the case in which all responses to the DMA requests that have been issued to an external apparatus such as the HBA 212 are reported.

The LPAR program 153 passes a request for transferring data of a guest memory region that has not been reflected to the transfer destination virtual computer 107 to the transfer source LPAR mover 101 in a state in which there is not writing to the guest memory 109 (step S309). Here, the data of a target in the step S309 includes data in a state of the real HBA virtual port 111 that seems virtually to the guest program 100 and data in a state of a device such as the VNIC 110. In the case in which the transfer of all target data in the step S309 is completed, the transfer destination LPAR 180 that is provided with the contents equivalent to those of the transfer source LPAR 150 exists in the transfer destination physical computer 201.

The transfer source LPAR that has received the transfer request of data transfers data to the transfer route for the live migration (step S403).

In the case in which the LPAR program 153 completes the transfer of all data in the step S309, the LPAR program 153 reports the data transfer completion to the transfer source LPAR mover 101 (step S310).

The transfer source LPAR mover 101 that has received the report of the data transfer completion transmits the LPAR activation request such as a request for activating an L processor program 181 that has been duplicated to the transfer destination physical computer 201 to the transfer destination LPAR mover 102 (step S404). By this LPAR activation request, the transfer destination virtual computer 107 is constructed in the transfer destination physical computer 201 and the guest program 103 is executed.

After the transfer destination LPAR mover 102 activates the L processor program 181 of a transfer destination, the transfer source LPAR mover 101 transmits an end request to the LPAR program 153. The LPAR program 153 executes the end processing such as an open of a memory that has been used and a usage stop of the dummy HBA virtual port 112, transmits the end processing request to the L processor program 151, and stops the LPAR program 153 itself (step S311). In the case in which the L processor program 151 receives the end processing request (step S209), the L processor program 151 executes the end processing such as an open of a memory that has been used (step S210) and stops the L processor program 151 itself.

In the next place, the physical computer 201 of the transfer destination will be described in the following.

Figure 11:
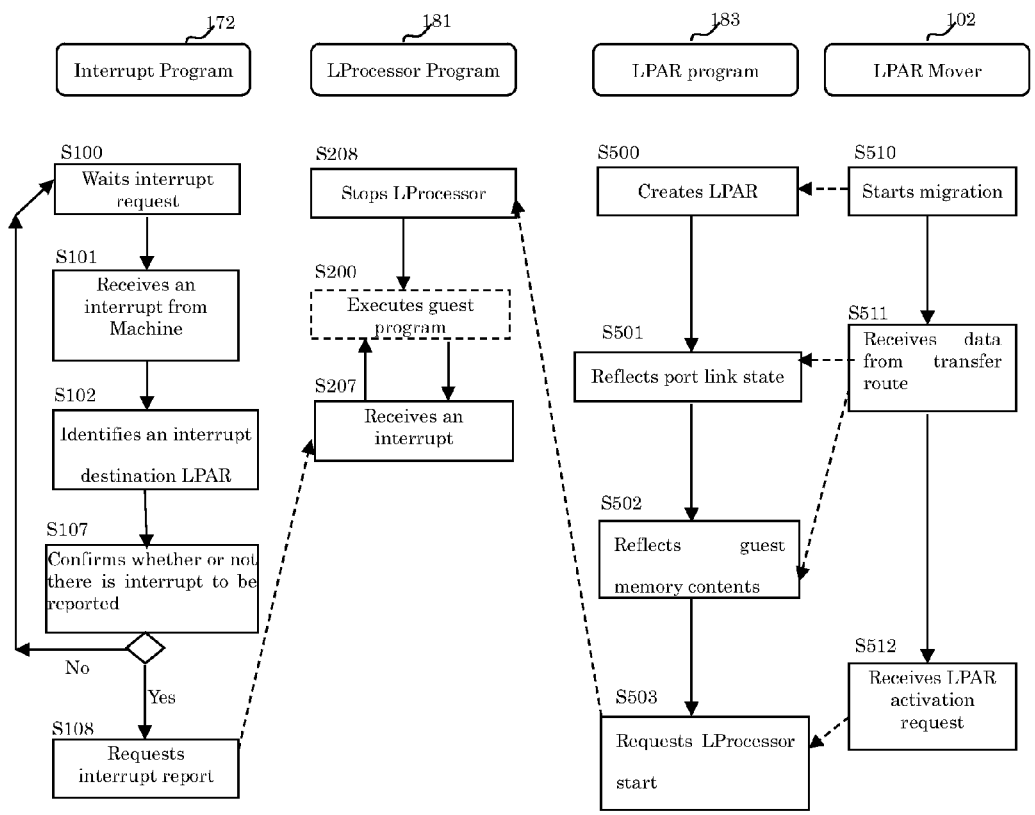
FIG. 11 is a flowchart of a processing that is executed by a program that is operated on a transfer destination physical computer in accordance with an embodiment of the present invention.

FIG. 11 is a flowchart of a processing that is executed by a program that is operated on a transfer destination physical computer in accordance with an embodiment of the present invention.

For the transfer destination physical computer 201, in the case in which the transfer destination LPAR mover 102 receives the start of the live migration from the transfer source physical computer 200, the transfer destination LPAR mover 102 requests a creation of the transfer destination LPAR 180 to the LPAR program 183 (step S510).

The LPAR program 183 that has receives the creation request creates the transfer destination LPAR 180 (step S500). At this point of time, the transfer destination LPAR 180 is not in a state equivalent to that of the transfer source LPAR 150. In other words, the processing for making a state of a real HBA virtual port 143 that is supplied to the guest program 103 (a duplicate of the guest program 100) by the transfer destination LPAR 180 and all of the contents of the guest memory 141 to be equivalent to a state and the contents that have been supplied to the guest program 100 by the transfer source LPAR 150 will be executed after that.

In order to make the states and the contents of the transfer destination LPAR 180 to be equivalent to each other, the transfer destination LPAR mover 102 receives data that is transmitted from the transfer source physical computer 200 via the transfer route (step S511), and the data that has been received by the LPAR program 183 is reflected as a state of the real HBA virtual port 143 (step S501) and is reflected as the contents of the guest memory 141 (step S502).

As described above, in the case in which all of data that is required for creating the transfer destination virtual computer 107 that is a duplicate equivalent to the transfer source virtual computer 104 is transmitted to the transfer destination physical computer 201, the transfer source LPAR mover 101 sends an LPAR activation request to the transfer destination LPAR mover 102 (step S404). Consequently, in the case in which the transfer destination LPAR mover 102 receives the LPAR activation request, the transfer destination LPAR mover 102 requests an activation of the L processor program 181 to the LPAR program 183 (step S512). In the case in which the LPAR program 183 receives the activation request from the transfer destination LPAR mover 102, the LPAR program 183 transmits a start request to the L processor program 181 (step S503). Here, the L processor program 181 has waited in a state of a program stop (step S208) from when the transfer destination LPAR 180 was created.

In the case in which the L processor program 181 receives the start request from the LPAR program 183, the L processor program 181 starts an operation from the stop state and then changes a control to the guest program 103 (step S200). After that, the L processor program 181 executes the processing equivalent to that of the step S207 of the L processor program 151 of a transfer source.

An interrupt program 174 of a transfer destination executes the processing (steps S100, S101, S102, S107, and S108) equivalent to that other than processing related to a bandwidth control for an interrupt program 152 of a transfer source. By this configuration, for the transfer destination physical computer 201, the transfer destination virtual computer 107 that is equivalent to the transfer source virtual computer 104 is constructed and operated, and the transfer destination virtual computer 107 executes the guest program 103 that is equivalent to the guest program 101. By this configuration, a virtual computer of the transfer source physical computer 200 is moved to the transfer destination physical computer 201.

The present invention is not restricted to the above described embodiment and includes a wide variety of modified examples. For instance, the above described embodiment is for explaining the present invention in an easily understood manner, and the present invention is not necessarily restricted to an embodiment that is provided with all components that have been described.

What is claimed is:

1. A computer system comprising:
   a first physical computer; and
   a second physical computer that is coupled to the first physical computer,
   wherein the first physical computer is provided with a control device and a storage device that is coupled to the control device,
   wherein the control device of the first physical computer is configured to
      construct a virtual computer;
      execute a predetermined guest program on the virtual computer; and
      detect when the guest program has executed writing to a guest memory,
   wherein a part of a region of the storage device is used as a virtual storage device that is a storage device for the virtual computer,
   wherein the control device is configured to execute, when executing a live migration which is to migrate the virtual computer of the first physical computer to the second physical computer and detecting that the guest program has executed writing to the guest memory, a control for reducing a data writing amount in a certain period of time to a virtual storage device that has been allocated to the virtual computer,
   wherein the first physical computer is provided with a transfer device that can store data to the storage device regardless of the control device, and
   wherein the control device is configured to
      issue a data acquisition request to the transfer device by the guest program; and
      temporarily hold an interrupt for informing the guest program of a data acquisition response when the data acquisition response that is a response to the data acquisition request is sent from the transfer device.

2. A computer system according to claim 1,
wherein the control device is configured to control, when temporarily holding an interrupt for informing the guest program of a data acquisition response, the hold of an interrupt for informing of a data acquisition response based on a data length of the acquired data corresponding to the data acquisition response and a holding time when the hold is executed.

3. A computer system according to claim 2,
wherein the control device is configured to
cancel the hold of an interrupt for informing of the data acquisition response based on a data length of the acquired data corresponding to the data acquisition response and a holding time when the hold is executed, and
execute an interrupt for informing of the data acquisition response.

4. A computer system according to claim 1,
wherein the control device is configured to execute an interrupt for informing of the data acquisition response corresponding to the data acquisition request before a timeout to the data acquisition request for the guest program.

5. A computer system according to claim 1,
wherein the control device is configured to set the virtual storage device in a write protecting state in which writing of data is prohibited at a predetermined point of time when the live migration is executed.

6. A computer system according to claim 5,
wherein the control device is configured to cancel the write protecting state of the virtual storage device when a data amount of write data to the virtual storage device is equal to or less than a predetermined value.

7. A computer system according to claim 1,
wherein the control device is configured to
store information capable of identifying a region in which updating occurs for the virtual storage device into the storage device; and
transmit data of a region that has been updated for the virtual storage device to the second physical computer.

8. A computer system according to claim 7,
wherein the control device is configured to execute an instruction for activating a new virtual storage device after completing a transfer of data necessary to construct the new virtual storage device that is equivalent to the virtual storage device to the second physical computer.

9. A virtualization mechanism comprising:
a virtualization section that is configured to construct a virtual computer on a physical computer that is provided with a control device and a storage device that is coupled to the control device, and
a control section,
wherein the control device of the physical computer is configured to execute a predetermined guest program on the virtual computer and detect when the guest program has executed writing to a guest memory,
wherein a part of a region of the storage device is used as a virtual storage device that is a storage device for the virtual computer,
wherein the control section is configured to, when making the physical computer execute a live migration which is to migrate the virtual computer of the physical computer to another physical computer and detecting that the guest program has executed writing to a guest memory, make the physical computer reduce a data writing amount in a certain period of time to a virtual storage device that has been allocated to the virtual computer,
wherein the physical computer is provided with a transfer device that can store data to the storage device regardless of the control device, and
wherein the control section is configured to
make the physical computer issue a data acquisition request to the transfer device by the guest program; and
make the physical computer temporarily hold an interrupt for informing the guest program of a data acquisition response in the case in which the data acquisition response that is a response to the data acquisition request is sent from the transfer device.

10. A virtualization mechanism according to claim 9,
wherein the control section is configured to make the physical computer set the virtual storage device in a write protecting state in which writing of data is prohibited at a predetermined point of time when the live migration is executed.

11. A control method for computer system comprising a first physical computer and a second physical computer,
wherein first physical computer is provided with a control device and a storage device that is coupled to the control device,
wherein the control device of the first physical computer is configured to construct a virtual computer and can execute a predetermined guest program on the virtual computer and detect when the guest program has executed writing to a guest memory,
wherein a part of a region of the storage device is used as a virtual storage device that is a storage device for the virtual computer, and the control method comprising the steps of:
executing, when executing a live migration which is to migrate the virtual computer of the first physical computer to the second physical computer and detecting that the guest program has executed writing to the guest memory, a control for reducing a data writing amount in a certain period of time to a virtual storage device that has been allocated to the virtual computer,
wherein the first physical computer is provided with a transfer device that can store data to the storage device regardless of the control device,
the control method comprising the steps of:
issuing a data acquisition request to the transfer device by the guest program; and
temporarily holding an interrupt for informing the guest program of a data acquisition response in the case in which the data acquisition response that is a response to the data acquisition request is sent from the transfer device.

12. A control method according to claim 11, further comprising a step of
setting the virtual storage device in a write protecting state in which writing of data is prohibited at a predetermined point of time when the live migration is executed.

* * * * *